US012603731B2

(12) United States Patent
Wang et al.

(10) Patent No.: US 12,603,731 B2
(45) Date of Patent: Apr. 14, 2026

(54) CARRIER CONFIGURATION METHOD AND RELATED DEVICE

(71) Applicant: HUAWEI TECHNOLOGIES CO., LTD., Shenzhen (CN)

(72) Inventors: Zhou Wang, Shenzhen (CN); Lixia Xue, Beijing (CN); Haibo Xu, Beijing (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 627 days.

(21) Appl. No.: 18/008,513

(22) PCT Filed: Jun. 3, 2021

(86) PCT No.: PCT/CN2021/098214
§ 371 (c)(1),
(2) Date: Dec. 6, 2022

(87) PCT Pub. No.: WO2021/254166
PCT Pub. Date: Dec. 23, 2021

(65) Prior Publication Data
US 2023/0344566 A1     Oct. 26, 2023

(30) Foreign Application Priority Data

Jun. 15, 2020    (CN) ......................... 202010543582.3
Aug. 12, 2020    (CN) ......................... 202010809416.3

(51) Int. Cl.
H04L 5/00        (2006.01)
H04B 17/309      (2015.01)
H04B 17/318      (2015.01)

(52) U.S. Cl.
CPC ........... H04L 5/001 (2013.01); H04B 17/328 (2023.05); H04B 17/347 (2023.05)

(58) Field of Classification Search
CPC ..... H04L 5/001; H04L 5/0053; H04L 5/0048; H04B 17/328; H04B 17/347;
(Continued)

(56) References Cited

U.S. PATENT DOCUMENTS 10,128,991 B2 * 11/2018 Marinier ............... H04W 76/19
11,039,480 B2 *  6/2021 Jeon ...................... H04L 5/0048
(Continued)

FOREIGN PATENT DOCUMENTS

CA        3095896 A1 * 10/2019 ........... H04W 76/19
CN        109728887 A     5/2019
(Continued)

OTHER PUBLICATIONS

NTT Docomo et al: "Remaining issues on other aspect of carrier aggregation", 3GPP Draft; R1-1720826, 3rd Generation Partnership Project (3GPP), Mobile Competence Centre ; 650, Route Des Lucioles ; F-06921 Sophia-Antipolis Cedex ; France, vol. RAN WG1, No. Reno, USA; Nov. 27, 2017-Dec. 1, 2017 Nov. 18, 2017 (Nov. 18, 2017), XP051370254, total 9 pages.
(Continued)

*Primary Examiner* — Ayaz R Sheikh
*Assistant Examiner* — Louis Samara

(57) ABSTRACT

A carrier configuration method and a related device are provided. A first carrier and a second carrier are configured for an electronic device, and the second carrier is a supplementary uplink carrier of the first carrier. The method includes: The electronic device receives a first message, where the first message includes configuration information of a secondary cell, and the secondary cell includes at least a serving cell corresponding to the second carrier. The electronic device configures, based on the configuration information of the secondary cell, the serving cell corresponding to the second carrier. That the serving cell corre-
(Continued)

sponding to the second carrier is configured includes: An uplink of the second carrier remains as a supplementary uplink of the first carrier, or the supplementary uplink of the second carrier is deactivated, or an uplink of the second carrier is aggregated with an uplink of the first carrier.

19 Claims, 16 Drawing Sheets

(58) Field of Classification Search
CPC . H04W 76/15; H04W 72/0453; H04W 76/34; H04W 72/23; H04W 52/281; H04W 76/19; Y02D 30/70
See application file for complete search history.

(56) References Cited

U.S. PATENT DOCUMENTS

| | | | | |
|---|---|---|---|---|
| 11,576,158 B2 * | 2/2023 | Liu | .......................... | H04L 5/001 |
| 2019/0223116 A1 * | 7/2019 | Chen | ..................... | H04W 24/10 |
| 2019/0274100 A1 * | 9/2019 | Kazmi | .............. | H04W 52/0206 |
| 2019/0313348 A1 * | 10/2019 | MolavianJazi | ..... | H04W 52/281 |
| 2020/0053710 A1 * | 2/2020 | MolavianJazi | ... | H04W 72/0473 |
| 2020/0053799 A1 * | 2/2020 | Jeon | ....................... | H04L 5/0048 |
| 2020/0275495 A1 * | 8/2020 | Yang | ...................... | H04W 8/22 |
| 2020/0367289 A1 * | 11/2020 | Choi | ................. | H04W 74/0808 |
| 2022/0312440 A1 * | 9/2022 | Bagheri | ............. | H04W 72/044 |
| 2023/0344566 A1 * | 10/2023 | Wang | ................... | H04B 17/328 |
| 2025/0055793 A1 * | 2/2025 | Yao | ........................ | H04W 76/19 |

FOREIGN PATENT DOCUMENTS

| | | | | | |
|---|---|---|---|---|---|
| CN | 109787726 | A | | 5/2019 | |
| CN | 113811003 | B | * | 5/2025 | .......... H04B 17/347 |
| EP | 3949472 | B1 | * | 5/2024 | ............. H04W 8/24 |
| WO | 2019096691 | A1 | | 5/2019 | |
| WO | 2019098710 | A1 | | 5/2019 | |
| WO | WO-2020060890 | A9 | * | 2/2021 | .......... H04W 72/535 |

OTHER PUBLICATIONS

R1-1718224, NTT Docomo, Inc., 3GPP TSG RAN WG1 Meeting 90bis, Prague, CZ, Oct. 9-13, 2017, 3 pages.

* cited by examiner

Network device 100

Electronic device 200

1115

Transceiver — 1113

Processor — 1111

Network interface — 1114

Memory — 1112

|  | Time domain 0 | Time domain 1 | Time domain 2 | Time domain 3 | Time domain 4 |
|---|---|---|---|---|---|
| First carrier | NDL downlink (terminal primary cell) | NDL downlink (terminal primary cell) | NDL downlink (terminal primary cell) | NDL downlink (terminal primary cell) | NUL uplink (terminal primary cell) |
| Second carrier | SUL supplementary uplink (terminal primary cell) | SUL supplementary uplink (terminal primary cell) | SUL supplementary uplink (terminal primary cell) | SUL supplementary uplink (terminal primary cell) | SUL |

FIG. 3A

|  | Time domain 0 | Time domain 1 | Time domain 2 | Time domain 3 | Time domain 4 |
|---|---|---|---|---|---|
| First carrier | NDL downlink (terminal primary cell) | NDL downlink (terminal primary cell) | NDL downlink (terminal primary cell) | NDL downlink (terminal primary cell) | NDL downlink (terminal primary cell) |
| Second carrier | DL downlink | DL downlink | DL downlink | SUL supplementary uplink (terminal primary cell) | UL uplink |

FIG. 3B

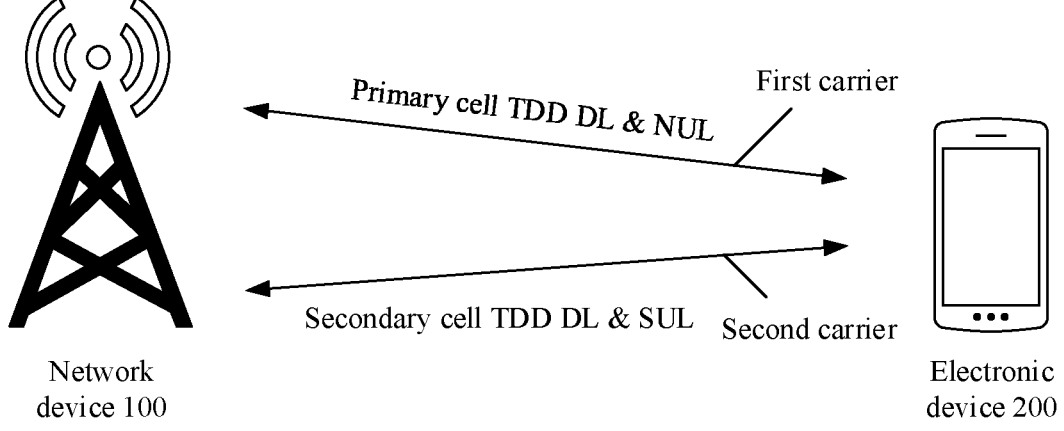

First carrier

Primary cell TDD DL & NUL

Secondary cell TDD DL & SUL    Second carrier

Network
device 100

Electronic
device 200

FIG. 4A

| | Time domain 0 | Time domain 1 | Time domain 2 | Time domain 3 | Time domain 4 |
|---|---|---|---|---|---|
| First carrier | DL downlink (terminal primary cell) | DL downlink (terminal primary cell) | DL downlink (terminal primary cell) | DL downlink (terminal primary cell) | NUL uplink (terminal primary cell) |

| | Time domain 0 | Time domain 1 | Time domain 2 | Time domain 3 | |
|---|---|---|---|---|---|
| Second carrier | DL downlink (terminal secondary cell) | DL downlink (terminal secondary cell) | DL downlink (terminal secondary cell) | SUL supplementary uplink (terminal primary cell) | |

FIG. 4B

| Slot<br>slot 0 | Slot<br>slot 1 | Slot<br>slot 2 | Slot<br>slot 3 | Slot<br>slot 4 | Slot<br>slot 5 | Slot<br>slot 6 | Slot<br>slot 7 | Slot<br>slot 8 | Slot<br>slot 9 |
|---|---|---|---|---|---|---|---|---|---|
| Downlink<br>DL | Downlink<br>DL | Downlink<br>DL | Downlink<br>DL | Downlink<br>DL | Downlink<br>DL | Downlink<br>DL | | Supplementary-<br>uplink SUL | Supplementary-<br>uplink SUL |

FIG. 4C

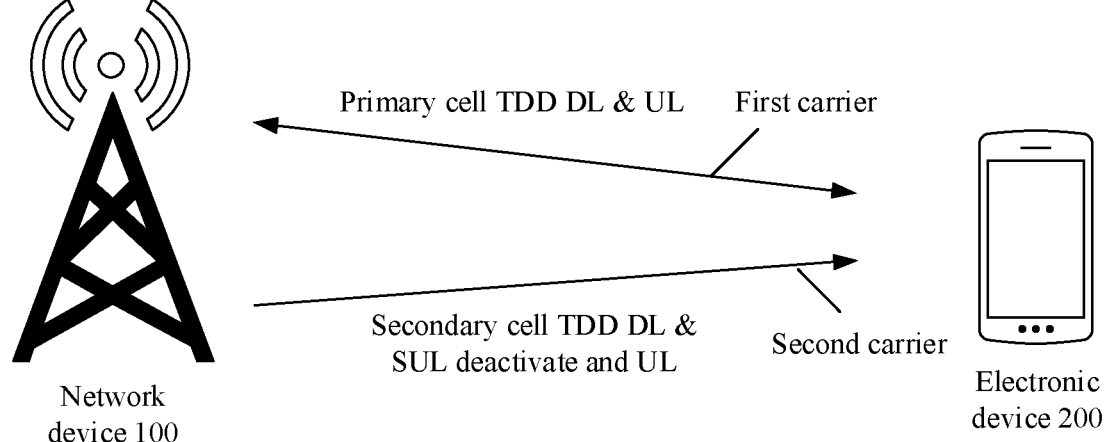

Primary cell TDD DL & UL     First carrier

Secondary cell TDD DL & SUL deactivate and UL     Second carrier

Network device 100

Electronic device 200

FIG. 5A

| | Time domain 0 | Time domain 1 | Time domain 2 | Time domain 3 | Time domain 4 |
|---|---|---|---|---|---|
| First carrier | DL downlink (terminal primary cell) | DL downlink (terminal primary cell) | DL downlink (terminal primary cell) | DL downlink (terminal primary cell) | UL uplink (terminal primary cell) |

| | Time domain 0 | Time domain 1 | Time domain 2 | Time domain 3 | |
|---|---|---|---|---|---|
| Second carrier | DL downlink (terminal secondary cell) | DL downlink (terminal secondary cell) | DL downlink (terminal secondary cell) | UL uplink (terminal secondary cell) | |

FIG. 5B

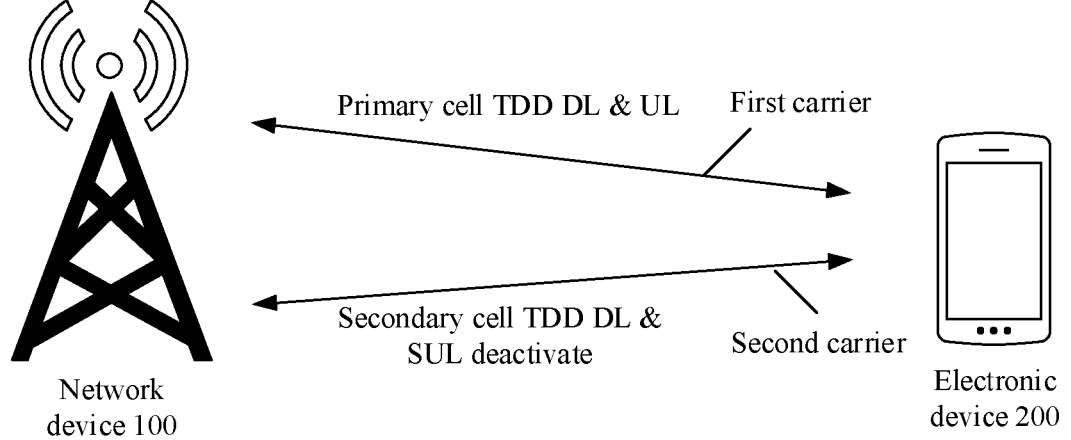

Primary cell TDD DL & UL     First carrier

Secondary cell TDD DL & SUL deactivate     Second carrier

Network device 100

Electronic device 200

FIG. 5C

| | Time domain 0 | Time domain 1 | Time domain 2 | Time domain 3 | Time domain 4 |
|---|---|---|---|---|---|
| First carrier | DL downlink (terminal primary cell) | DL downlink (terminal primary cell) | DL downlink (terminal primary cell) | DL downlink (terminal primary cell) | UL uplink (terminal primary cell) |

| | Time domain 0 | Time domain 1 | Time domain 2 | Time domain 3 | |
|---|---|---|---|---|---|
| Second carrier | DL downlink (terminal secondary cell) | DL downlink (terminal secondary cell) | DL downlink (terminal secondary cell) | Deactivated SUL (terminal primary cell) | |

FIG. 5D

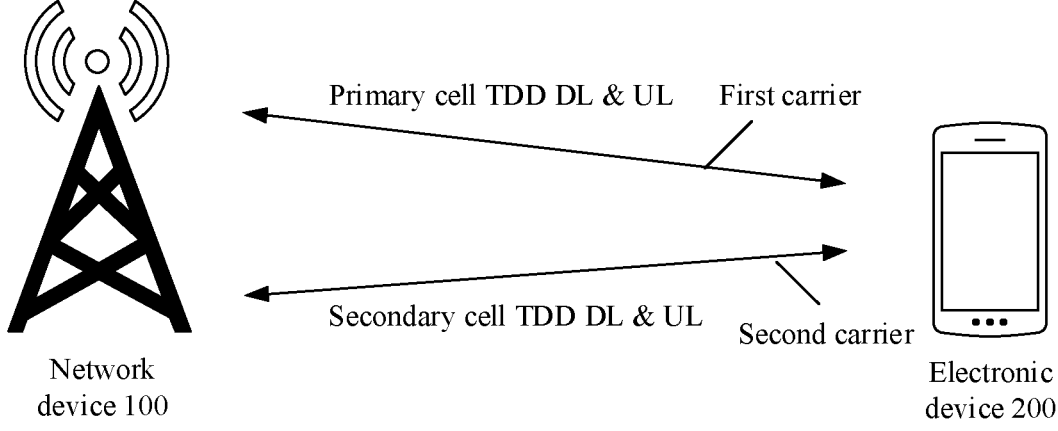

Primary cell TDD DL & UL     First carrier

Secondary cell TDD DL & UL     Second carrier

Network
device 100

Electronic
device 200

FIG. 6A

|  | Time domain 0 | Time domain 1 | Time domain 2 | Time domain 3 | Time domain 4 |
|---|---|---|---|---|---|
| First carrier | DL downlink (terminal primary cell) | DL downlink (terminal primary cell) | DL downlink (terminal primary cell) | DL downlink (terminal primary cell) | UL uplink (terminal primary cell) |

|  | | | | | |
|---|---|---|---|---|---|
| Second carrier | DL downlink (terminal secondary cell) | DL downlink (terminal secondary cell) | DL downlink (terminal secondary cell) | UL uplink (terminal secondary cell) | |

FIG. 6B

CARRIER CONFIGURATION METHOD AND RELATED DEVICE

CROSS-REFERENCE TO RELATED APPLICATIONS

This application is a National Stage of International Application No. PCT/CN2021/098214, filed on Jun. 3, 2021, which claims priority to Chinese Patent Application No. 202010543582.3, filed on Jun. 15, 2020 and Chinese Patent Application No. 202010809416.3, filed on Aug. 12, 2020, all of which are hereby incorporated by reference in their entireties.

TECHNICAL FIELD

The present disclosure relates to the communications field, and in particular, to a carrier configuration method and a related device.

BACKGROUND

In a long term evolution (Long Term Evolution, LTE) network or a 4th generation mobile communications (the 4th generation, 4G) network, a carrier aggregation (Carrier Aggregation, CA) technology is introduced, to aggregate a plurality of continuous or discontinuous spectrums for use, thereby ensuring a requirement of mobile communication for a large bandwidth and increasing a communication rate. In a new radio (New Radio, NR) network or a 5th generation mobile communications (the 5th generation, 5G) network, a supplementary uplink (Supplementary uplink, SUL) technology is proposed, to ensure coverage of an uplink signal at a high frequency by providing a supplementary uplink.

In the LTE network or the 4G network, CA is a technology in which an electronic device (or referred to as user equipment (User Equipment, UE)) is connected to and communicates with a network device by using a plurality of cells (Cell). One cell is used as a primary cell (Primary Cell, PCell) of the electronic device, and other cells are used as secondary cells (Secondary Cell, S Cell) of the electronic device. The network device may configure DL (downlink) CA for the electronic device, and a cell in a state based on DL CA is an SCell. In the NR network or the 5G network, in one cell configured for UE, UE can be configured with one downlink carrier and two uplink carriers. One of the uplink carriers is used as a supplementary SUL, and the SUL may be configured for a PCell or an SCell.

How to process an SUL operation and a CA operation on a carrier that supports the SUL operation is a technical problem that urgently needs to be resolved.

SUMMARY

Embodiments of this application disclose a carrier configuration method and a related device, to flexibly support an SUL operation and a CA operation, improve resource utilization, and improve a data transmission rate of an electronic device.

The foregoing objective and other objectives are achieved by using features in the independent claims. Further implementations are embodied in the dependent claims, the specification, and the accompanying drawings.

According to a first aspect, an embodiment of this application provides a carrier configuration method. The method is applied to an electronic device, a first carrier and a second carrier may be configured for the electronic device, and the second carrier is a supplementary uplink carrier of the first carrier. The method may include: The electronic device receives a first message, where the first message may include configuration information of a secondary cell, and the secondary cell includes at least a serving cell corresponding to the second carrier. The electronic device configures, based on the configuration information of the secondary cell, the serving cell corresponding to the second carrier. That a serving cell is configured corresponding to the second carrier may include the following several cases: an uplink of the second carrier remains as a supplementary uplink of the first carrier, the supplementary uplink of the second carrier is deactivated, or the uplink of the second carrier is aggregated with an uplink of the first carrier.

According to the technical solution described in the first aspect, in a case in which the second carrier is the supplementary uplink carrier of the first carrier, when the electronic device configures, based on the configuration information of the secondary cell sent by the network device, the serving cell corresponding to the second carrier, the electronic device may flexibly use a resource of the second carrier, and the serving cell corresponding to the second carrier may be configured as follows: the uplink of the second carrier remains as the supplementary uplink of the first carrier, the supplementary uplink of the second carrier is deactivated, or the uplink of the second carrier is aggregated with the uplink of the first carrier. In this way, resource use efficiency can be improved, resource waste can be avoided, and data transmission experience of the electronic device can be improved.

In still another possible implementation of the first aspect, when that a serving cell corresponding to the second carrier is configured is that the supplementary uplink of the second carrier is deactivated, the method further includes: The electronic device receives a third message, where the third message indicates to release or deactivate the secondary cell. The electronic device indicates to release or deactivate, based on the third message, the secondary cell, and activate the supplementary uplink of the second carrier.

Based on the foregoing technical solution, an SUL activation and deactivation mechanism is defined, so that SUL transmission can be used more flexibly, and the SUL is deactivated when the SUL does not need to be used, thereby reducing energy consumption of the electronic device.

In still another possible implementation of the first aspect, when the uplink of the second carrier remains as the supplementary uplink of the first carrier, the method further includes: The electronic device receives the third message, where the third message indicates to release or deactivate the secondary cell. The electronic device releases or deactivates the secondary cell, and reserves the supplementary uplink of the second carrier.

Based on the foregoing technical solution, the electronic device may reuse and retain a coverage advantage of the SUL.

In still another possible implementation of the first aspect, when the uplink of the second carrier is aggregated with the uplink of the first carrier, the method further includes: The electronic device receives a third message, where the third message indicates to release or deactivate the secondary cell. The electronic device releases or deactivates the secondary cell, and reconfigures the supplementary uplink of the second carrier.

In still another possible implementation of the first aspect, the serving cell corresponding to the second carrier includes an uplink of the serving cell corresponding to the second carrier, and that the serving cell corresponding to the second carrier is configured specifically includes: A second message is received, where the second message is used to indicate to configure the uplink of the serving cell corresponding to the second carrier. Based on the second message, the uplink of the second carrier remains as the supplementary uplink of the first carrier, or the supplementary uplink of the second carrier is deactivated, or the uplink of the second carrier is configured to be aggregated with the uplink of the first carrier.

Based on the foregoing technical solution, the network device configures, for the electronic device, the uplink of the serving cell corresponding to the first carrier, so that configuration can be performed based on a network requirement, thereby improving flexibility of the configuration.

In still another possible implementation of the first aspect, the method further includes: A third message is received, where the third message indicates to release or deactivate the secondary cell. The electronic device releases or deactivates the secondary cell, and configures the uplink of the second carrier. That the uplink of the second carrier is configured includes: the uplink of the second carrier remains as the supplementary uplink of the first carrier, the supplementary uplink of the second carrier is activated, or the uplink of the second carrier is reconfigured as the supplementary uplink of the first carrier.

In still another possible implementation of the first aspect, the method further includes: A third message is received, where the third message indicates to release or deactivate the secondary cell. The electronic device releases or deactivates the secondary cell. A fourth message is received, where the fourth message indicates to configure the uplink of the second carrier. Based on the fourth message, then uplink of the second carrier is configured. That the uplink of the second carrier is configured includes: The uplink of the second carrier remains as the supplementary uplink of the first carrier, or the supplementary uplink of the second carrier is activated, or the uplink of the second carrier is reconfigured as the supplementary uplink of the first carrier.

According to a second aspect, an embodiment of this application provides a carrier configuration device. A first carrier and a second carrier are configured for the device, the second carrier is a supplementary uplink carrier of the first carrier, and the device includes: a first receiving unit, configured to receive a first message, where the first message includes configuration information of a secondary cell, and the secondary cell includes at least a serving cell corresponding to the second carrier; and a first configuration unit, configured to configure, based on the configuration information of the secondary cell, the serving cell corresponding to the second carrier. The first configuration unit is specifically configured to: maintain an uplink of the second carrier as a supplementary uplink of the first carrier, deactivate a supplementary uplink of the second carrier, or aggregate an uplink of the second carrier with an uplink of the first carrier.

In still another possible implementation of the second aspect, when the supplementary uplink of the second carrier is deactivated, the device further includes: a third receiving unit, configured to receive a third message, where the third message indicates to release or deactivate the secondary cell; and an activation unit, configured to release or deactivate the secondary cell, and activate the supplementary uplink of the second carrier.

In still another possible implementation of the second aspect, when the uplink of the second carrier remains as the supplementary uplink of the first carrier, the device further includes: a third receiving unit, configured to receive a third message, where the third message indicates to release or deactivate the secondary cell; and a reserving unit, configured to release or deactivate the secondary cell, and reserve the supplementary uplink of the second carrier.

In still another possible implementation of the second aspect, when the uplink of the second carrier is aggregated with the uplink of the first carrier, the device further includes: a third receiving unit, configured to receive a third message, where the third message indicates to release or deactivate the secondary cell; and a reconfiguration unit, configured to release or deactivate the secondary cell, and reconfigure the supplementary uplink of the second carrier.

In still another possible implementation of the second aspect, the serving cell corresponding to the second carrier includes an uplink of the serving cell corresponding to the second carrier, and the configuration unit is specifically configured to: receive a second message, where the second message is used to indicate to configure the uplink of the serving cell corresponding to the second carrier; and based on the second message, maintain the uplink of the second carrier as the supplementary uplink of the first carrier, deactivate the supplementary uplink of the second carrier, or configure the uplink of the second carrier to be aggregated with the uplink of the first carrier.

In still another possible implementation of the second aspect, the device further includes: a third receiving unit, configured to receive a third message, where the third message indicates to release or deactivate the secondary cell; a second configuration unit, configured to release or deactivate the secondary cell, and configure the uplink of the second carrier, where the second configuration unit is specifically configured to: maintain the uplink of the second carrier as the supplementary uplink of the first carrier, activate the supplementary uplink of the second carrier, or reconfigure the uplink of the second carrier as the supplementary uplink of the first carrier.

In still another possible implementation of the second aspect, the device further includes: a third receiving unit, configured to receive a third message, where the third message indicates to release or deactivate the secondary cell; a third configuration unit, configured to release or deactivate the secondary cell; a fourth receiving and configuring unit, configured to receive a fourth message, and configure the uplink of the second carrier. The fourth receiving and configuring unit is specifically configured to: maintain the uplink of the second carrier as the supplementary uplink of the first carrier, activate the supplementary uplink of the second carrier, or reconfigure the uplink of the second carrier as the supplementary uplink of the first carrier.

According to a third aspect, an embodiment of this application provides an electronic device. A first carrier and a second carrier are configured for the electronic device, and the second carrier is a supplementary uplink carrier of the first carrier. The electronic device includes at least one processor and a communications interface, and the at least one processor is configured to invoke a computer program stored in at least one memory, so that the device implements the first aspect or any one of the possible implementations in the first aspect.

According to a fourth aspect, an embodiment of this application provides a computer readable storage medium. The computer readable storage medium stores a computer program. When the computer program is run on one or more processors, the first aspect or any one of the possible implementations in the first aspect is performed.

According to a fifth aspect, an embodiment of this application further provides a computer program product. When the computer program product runs on one or more processors, the first aspect or any one of the possible implementations in the first aspect is performed.

According to a sixth aspect, an embodiment of this application further provides a chip system. The chip system includes at least one processor, a memory, and an interface circuit. The interface circuit is configured to provide an information input/output for the at least one processor, the at least one memory stores a computer program, and when the computer program is run on one or more processors, the first aspect or any one of the possible implementations in the first aspect is performed.

BRIEF DESCRIPTION OF DRAWINGS

The following describes the accompanying drawings used in embodiments of this application.

FIG. 3A is a schematic diagram of an SUL state according to an embodiment of this application;

FIG. 3B is a schematic diagram of another SUL state according to an embodiment of this application;

FIG. 4A is a schematic diagram of a communication scenario between an electronic device and a network device according to an embodiment of this application;

FIG. 4B is a schematic diagram of a working state between an electronic device and a network device according to an embodiment of this application;

FIG. 4C is a schematic diagram of a slot/symbol configuration according to an embodiment of this application;

FIG. 5A is a schematic diagram of another communication scenario between an electronic device and a network device according to an embodiment of this application;

FIG. 5B is a schematic diagram of another working state between an electronic device and a network device according to an embodiment of this application;

FIG. 5C is a schematic diagram of another communication scenario between an electronic device and a network device according to an embodiment of this application;

FIG. 5D is a schematic diagram of another working state between an electronic device and a network device according to an embodiment of this application;

FIG. 6A is a schematic diagram of another communication scenario between an electronic device and a network device according to an embodiment of this application;

FIG. 6B is a schematic diagram of another working state between an electronic device and a network device according to an embodiment of this application;

DESCRIPTION OF EMBODIMENTS

In descriptions of this application, unless otherwise specified, "I" means "or". For example, A/B may represent A or B. A term "and/or" in this specification describes only an association relationship between associated objects and indicates that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

It should be noted that, in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word "exemplary" or "example" or the like is intended to present a relative concept in a specific manner.

The following describes embodiments of this application with reference to the accompanying drawings in embodiments of this application.

Figure 1:
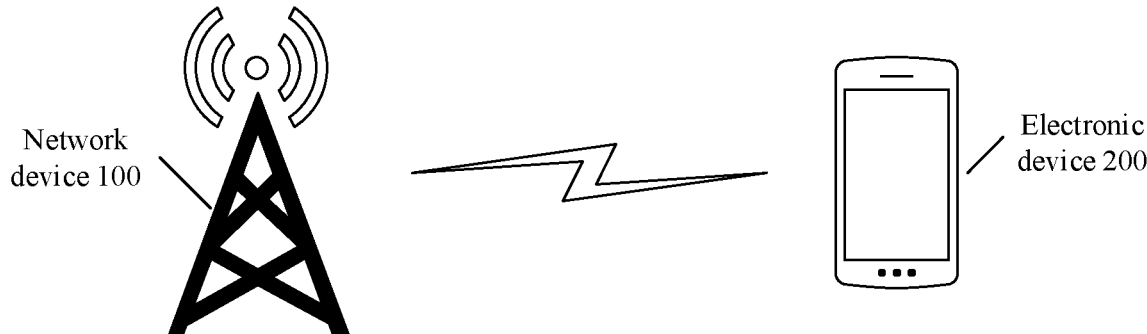
FIG. 1 is a schematic diagram of a structure of a communications system according to an embodiment of this application.

FIG. 1 is a schematic architectural diagram of a communications system according to an embodiment of this application. The communications system may include one or more network devices 100 and one or more electronic devices 200 connected to each of the one or more network devices 100 (FIG. 1 shows only one electronic device 200). FIG. 1 shows a network device and an electronic device. It should be noted that FIG. 1 is merely a schematic diagram, and does not constitute a limitation on an applicable scenario of the technical solutions provided in this application.

The communications system in embodiments of this application may be a communications system that supports a 4th generation (fourth generation, 4G) access technology, for example, a long term evolution (long term evolution, LTE) access technology. Alternatively, the communications system may be a communications system that supports a 5th generation (fifth generation, 5G) access technology, for example, a new radio (new radio, NR) access technology. Alternatively, the communications system may be a communications system that supports a 3rd generation (third generation, 3G) access technology, for example, a universal mobile telecommunications system (universal mobile telecommunications system, UMTS) access technology. Alternatively, the communications system may be a communications system that supports a plurality of wireless technologies, for example, a communications system that supports an LTE technology and an NR technology. In addition, the communications system may alternatively be applicable to a future-oriented communications technology.

The network device 100 in this embodiment of this application may be a device configured on an access network side to support an electronic device in accessing a communications system, for example, may be a base transceiver station (base transceiver station, BTS) and a base station controller (base station controller, BSC) in a 2G access technology communications system, a nodeB (node B) and a radio network controller (radio network controller, RNC) in a 3G access technology communications system, an evolved nodeB (evolved node B, eNB) in a 4G access technology communications system, and a next generation nodeB (next generation nodeB, gNB), a transmission reception point (transmission reception point, TRP), a relay node (relay node), an access point (access point, AP), and the like in a 5G access technology communications system.

The electronic device 200 in this embodiment of this application may be a device that provides voice or data connectivity for a user, for example, may also be referred to as user equipment (user equipment, UE), a mobile station (mobile station), a subscriber unit (subscriber unit), or a station (station). The electronic device may be a cellular phone (cellular phone), a personal digital assistant (personal digital assistant, PDA), a wireless modem (modem), a handheld device (handheld), a laptop computer (laptop computer), a cordless phone (cordless phone), a wireless local loop (wireless local loop, WLL), a pad (pad), or the like. With development of wireless communications technologies, a device that can access a communications system, communicate with a network side of the communications system, or communicate with another object by using the communications system may be the electronic device in embodiments of this application, for example, electronic devices and vehicles in intelligent transportation, household devices in smart home, electric meter reading instruments in smart grids, voltage monitoring instruments, environmental monitoring instruments, video surveillance instruments in intelligent security networks, cash registers, and the like. In this embodiment of this application, the electronic device may communicate with the network device.

Figure 1A:
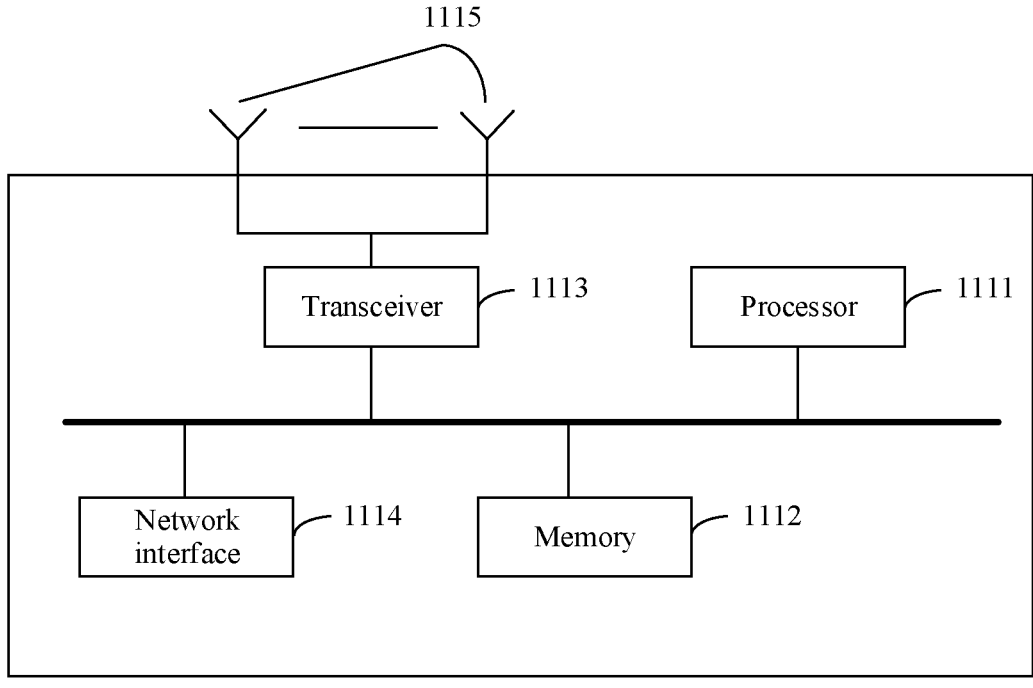
FIG. 1A is a schematic diagram of a structure of a network device according to an embodiment of this application.

Refer to FIG. 1A. FIG. 1A is a schematic diagram of a structure of a network device according to an embodiment of this application. The network device includes at least one processor 1111, at least one memory 1112, at least one transceiver 1113, at least one network interface 1114, and one or more antennas 1115. The processor 1111, the memory 1112, the transceiver 1113, and the network interface 1114 are connected to each other, for example, by using a bus. The antennas 1115 are connected to the transceiver 1113. The network interface 1114 is configured to enable the network device to be connected to another communications device through a communication link.

For example, the network device is connected to a core network element through an S1 interface. In this embodiment of this application, the connection may include various types of interfaces, transmission lines, buses, or the like. This is not limited in this embodiment.

The processor in embodiments of this application, for example, the processor 1111, may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 1111 may be a single-CPU (single-CPU) processor or a multi-CPU (multi-CPU) processor. The at least one processor 1111 may be integrated into one chip or located on a plurality of different chips.

The memory in embodiments of this application, for example, the memory 1112, may include at least one of the following types: a read-only memory (read-only memory, ROM) or another type of static storage device that can store static information and instructions, a random access memory (random access memory, RAM) or another type of dynamic storage device that can store information and instructions, or an electrically erasable programmable-only memory (Electrically erasable programmable-only memory, EEPROM). In some scenarios, the memory may alternatively be a compact disc read-only memory (compact disc read-only memory, CD-ROM), another compact disc storage, an optical disc storage (including a compressed optical disc, a laser disc, an optical disc, a digital versatile disc, a Blu-ray disc), a magnetic disk storage medium, another magnetic storage device, or any other medium that can be used to carry or store expected program code in a form of instructions or a data structure and that can be accessed by a computer. This is not limited thereto.

The memory 1112 may exist independently, and is connected to the processor 1111. Optionally, the memory 1112 may alternatively be integrated with the processor 1111, for example, integrated into a chip. The memory 1112 can store program code for executing the technical solutions in the embodiments of this application, and the processor 1111 controls the execution. Various types of executed computer program code may also be considered as a driver of the processor 1111. For example, the processor 1111 is configured to execute the computer program code stored in the memory 1112, to implement the technical solutions in the embodiments of this application.

The transceiver 1113 may be configured to support receiving or sending of a radio frequency signal between the network device and the electronic device, and the transceiver 1113 may be connected to the antenna 1115. Specifically, the one or more antennas 1115 may receive a radio frequency signal. The transceiver 1113 may be configured to: receive the radio frequency signal from the antenna, convert the radio frequency signal into a digital baseband signal or a digital intermediate frequency signal, and provide the digital baseband signal or the digital intermediate frequency signal for the processor 1111, so that the processor 1111 further processes the digital baseband signal or the digital intermediate frequency signal, for example, performs demodulation processing and decoding processing. In addition, the transceiver 1113 may be configured to: receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the transceiver 1113 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 1113 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as digital signals. The transceiver may be referred to as a transceiver circuit, a transceiver unit, a transceiver component, a sending circuit, a sending unit, a sending component, or the like.

Figure 1B:
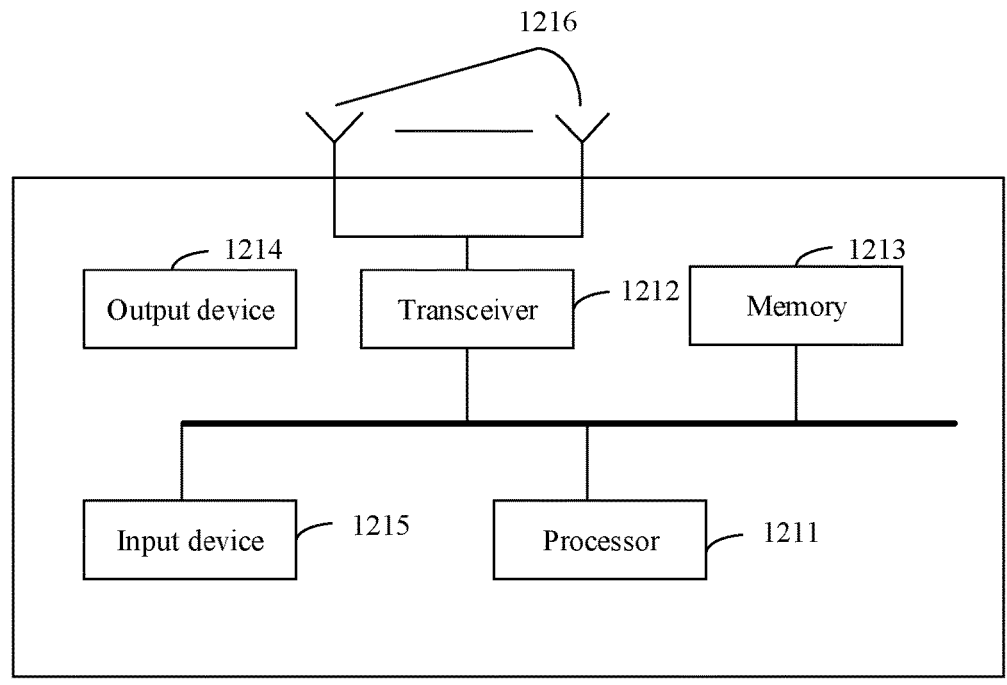
FIG. 1B is a schematic diagram of a structure of an electronic device according to an embodiment of this application.

Refer to FIG. 1B. FIG. 1B is a schematic diagram of a structure of an electronic device according to an embodiment of this application. The electronic device 200 includes at least one processor 1211, at least one transceiver 1212, and at least one memory 1213. The processor 1211, the memory 1213, and the transceiver 1212 are connected to each other. Optionally, the electronic device 121 may further include an output device 1214, an input device 1215, and one or more antennas 1216. The antennas 1216 are connected to the transceiver 1212, and the output device 1214 and the input device 1215 are connected to the processor 1211.

For the transceiver 1212, the memory 1213, and the antennas 1216, refer to related descriptions in FIG. 1A. Similar functions are implemented.

The processor 1211 may be a baseband processor, or may be a CPU. The baseband processor and the CPU may be integrated or separated.

The processor 1211 may be configured to implement various functions for the electronic device, for example, configured to process a communication protocol and communication data, or configured to: control the entire terminal device, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (Liquid Crystal Display, LCD), a light emitting diode (Light Emitting Diode, LED) display device, a cathode ray tube (Cathode Ray Tube, CRT) display device, a projector (projector), or the like. The input device 1215 communicates with the processor 1211, and may receive an input of a user in a plurality of manners. For example, the input device 1215 may be a mouse, a keyboard, a touchscreen device, or a sensing device.

For ease of understanding of embodiments of this application, related terms used in this specification are first briefly described.

1. Time division duplex (time division duplex, TDD) is a duplex communications technology in a communications system, and is used to separate a receiving channel and a sending channel, that is, an uplink and a downlink. In a communications system using a TDD mode, a same frequency domain resource is used for the uplink and the downlink, and the uplink and the downlink are distinguished by using different time domain resources. In LTE, there are seven types of TDD configurations. One frame includes ten subframes. If D represents a downlink subframe and U represents an uplink subframe, an arrangement order of Ds and Us is fixed in each configuration. In a cell, a TDD configuration may be a semi-static configuration or a static configuration. In NR, the TDD may also be referred to as dynamic TDD. A slot is a minimum time unit that can be scheduled. To perform scheduling more flexibly, configurations of different types of slots in each frame may dynamically change, and a quantity of slots included in each frame also varies with a subcarrier spacing. Based on different slot types, a slot may be an uplink-only slot, a downlink-only slot, an uplink dominated (uplink dominated) slot, a downlink dominated (downlink dominated) slot, or the like. Symbols in the uplink-only slot are all uplink symbols. Symbols in the downlink-only slot are all downlink symbols. A quantity of uplink symbols is greater than a quantity of downlink symbols in the uplink-dominated slot. A quantity of downlink symbols is greater than a quantity of uplink symbols in the downlink-dominated slot. In addition, a guard period may be configured between uplink and downlink symbols.

2. Frequency division duplexing (time division duplexing, FDD) is a duplex communications technology in a communications system, and is used to separate a receiving channel and a sending channel, that is, an uplink and a downlink. In a communications system using an FDD mode, a same time domain resource is used for the uplink and the downlink, and the uplink and the downlink are distinguished by using different frequency domain resources. For example, an uplink frequency range is different from a downlink frequency range.

3. A time domain resource is a resource in time domain. The time domain resource may be an uplink time domain resource, a downlink time domain resource, or a flexible time domain resource. In the NR, there may be at least three time domain resource configuration manners, for example, a cell-specific semi-static configuration manner, a user-specific semi-static configuration manner, and a user-specific dynamic configuration manner.

4. A flexible time domain resource may be understood as a time domain resource that is not configured as an uplink time domain resource or a downlink time domain resource, and the flexible time domain resource may be used as a guard period (guard period, GP) between the uplink time domain resource and the downlink time domain resource. The flexible time domain resource may be further configured as an uplink time domain resource or a downlink time domain resource. In the NR, in the cell-specific semi-static configuration manner, an uplink time domain resource, a downlink time domain resource, and a flexible time domain resource may be configured for an electronic device in a cell by using a cell-specific RRC message. For a flexible time domain resource configured in the cell-specific semi-static configuration manner, in the user-specific semi-static configuration manner, the flexible time domain resource may be configured as an uplink time domain resource or a downlink time domain resource for an electronic device by using a user-specific RRC message, or the flexible time domain resource is not configured (or in this case, it may be understood that the flexible time domain resource is still configured as a flexible time domain resource in the user-specific semi-static manner). For a flexible time domain resource configured in the cell-specific semi-static configuration manner or the user-specific semi-static configuration manner, in the user-specific dynamic configuration manner, the flexible time domain resource may be configured as an uplink time domain resource or a downlink time domain resource by an electronic device in a DCI manner, or the flexible time domain resource is not configured (or in this case, it may be understood that the flexible time domain resource is still configured as a flexible time domain resource in the user-specific dynamic manner). The flexible time domain resource may be referred to as an unknown (unknown) time domain resource.

5. A transmission time domain resource may be understood as a time domain resource that is configured for transmission. Herein, the transmission may include uplink transmission and downlink transmission. For example, the uplink transmission may include one or more of a channel sounding reference signal (sounding reference signal, SRS), a physical uplink shared channel (physical uplink shared channel, PUSCH), and a physical uplink control channel (physical uplink control channel, PUCCH). After a time domain resource is configured as an uplink time domain resource or a flexible time domain resource, the uplink time domain resource or the flexible time domain resource may be further configured for uplink transmission. For example, an uplink transmission time domain resource may be configured as a PUSCH time domain resource, an SRS time domain resource, or a PUCCH time domain resource, and a flexible time domain resource may be configured as an SRS time domain resource.

6. A slot (slot) is a minimum scheduling unit of a time domain resource. In the NR, a slot format may include 14 OFDM symbols, and a CP of each OFDM symbol is a normal CP; a slot format may include 12 OFDM symbols, and a CP of each OFDM symbol is an extended CP; or a slot format may include seven OFDM symbols, and a CP of each OFDM symbol is a normal CP. All OFDM symbols in one slot may be used for uplink transmission or downlink transmission; alternatively, some OFDM symbols in one slot may be used for downlink transmission, some OFDM symbols in the slot may be used for uplink transmission, and some OFDM symbols in the slot may be reserved and not used for transmission. It should be understood that the foregoing examples are merely examples for description, and shall not constitute any limitation on this application. In consideration of system forward compatibility, a slot format is not limited to the foregoing examples. In the NR, based on different subcarrier spacings, 1 ms may include different quantities of slots (slots). For example, when a subcarrier spacing is 15 kHz, 1 ms includes one slot, and the slot occupies 1 ms; and when a subcarrier spacing is 30 kHz, 1 ms includes two slots, and each slot occupies 0.5 ms.

7. A symbol (symbol) is a minimum unit of a time domain resource. A time length of one symbol is not limited in embodiments of this application. A length of one symbol may vary for different subcarrier spacings. Symbols may include an uplink symbol and a downlink symbol. By way of example, and not limitation, the uplink symbol may be referred to as, for example, a single carrier frequency division multiple access (Single Carrier Frequency Division Multiple Access, SC-FDMA) symbol or an orthogonal frequency division multiplexing (Orthogonal Frequency Division Multiplexing, OFDM) symbol; the downlink symbol may be referred to as, for example, an OFDM symbol.

In this embodiment of this application, the network device 100 and the electronic device 200 may communicate with each other in a TDD transmission manner, and different time domain resources are used for uplink transmission and downlink transmission. The network device 100 and the electronic device 200 may also communicate with each other in an FDD transmission manner, a same time domain resource is used for uplink and downlink transmission, and the uplink transmission and the downlink transmission are distinguished by using different frequency domain resources. The following embodiments of this application are described by using an example in which the network device 100 communicates with the electronic device 200 in a TDD transmission manner.

Figure 2:
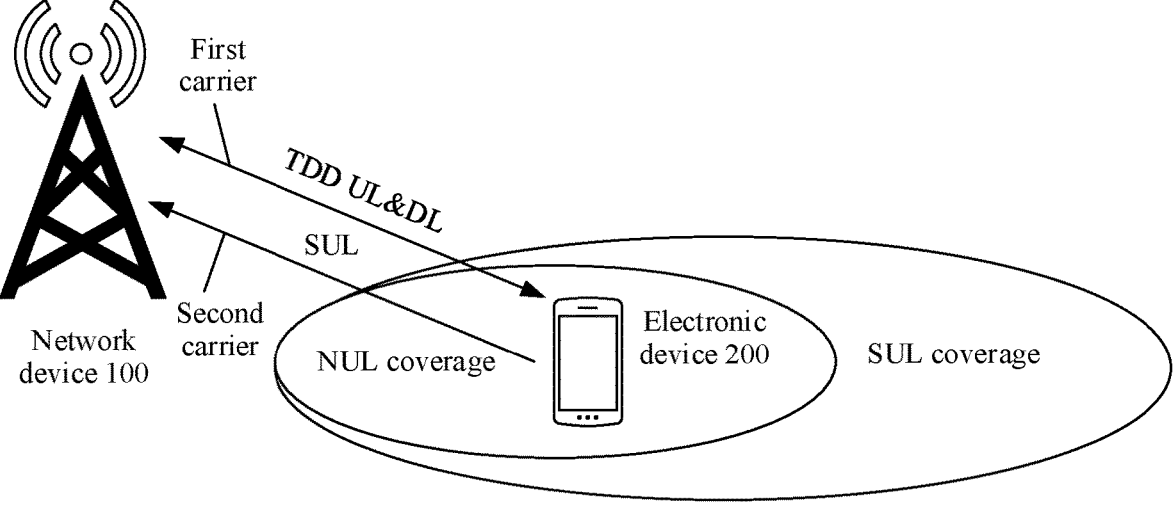
FIG. 2 is a schematic diagram of an SUL scenario according to an embodiment of this application.

A communications system shown in FIG. 2 supports a supplementary uplink (supplementary uplink, SUL) scenario. FIG. 2 is a schematic diagram of an SUL scenario. As shown in FIG. 2, the network device 100 may provide two types of uplink carriers for the electronic device 200: a normal uplink (normal uplink, NUL) carrier and a secondary uplink SUL carrier. Generally, a frequency band used by the SUL is lower than a frequency band used by the NUL, and coverage of the SUL is larger than coverage of the NUL. Alternatively, a frequency band used by the SUL is higher than a frequency band used by the NUL, and coverage of the SUL is smaller than coverage of the NUL.

Figure 3:
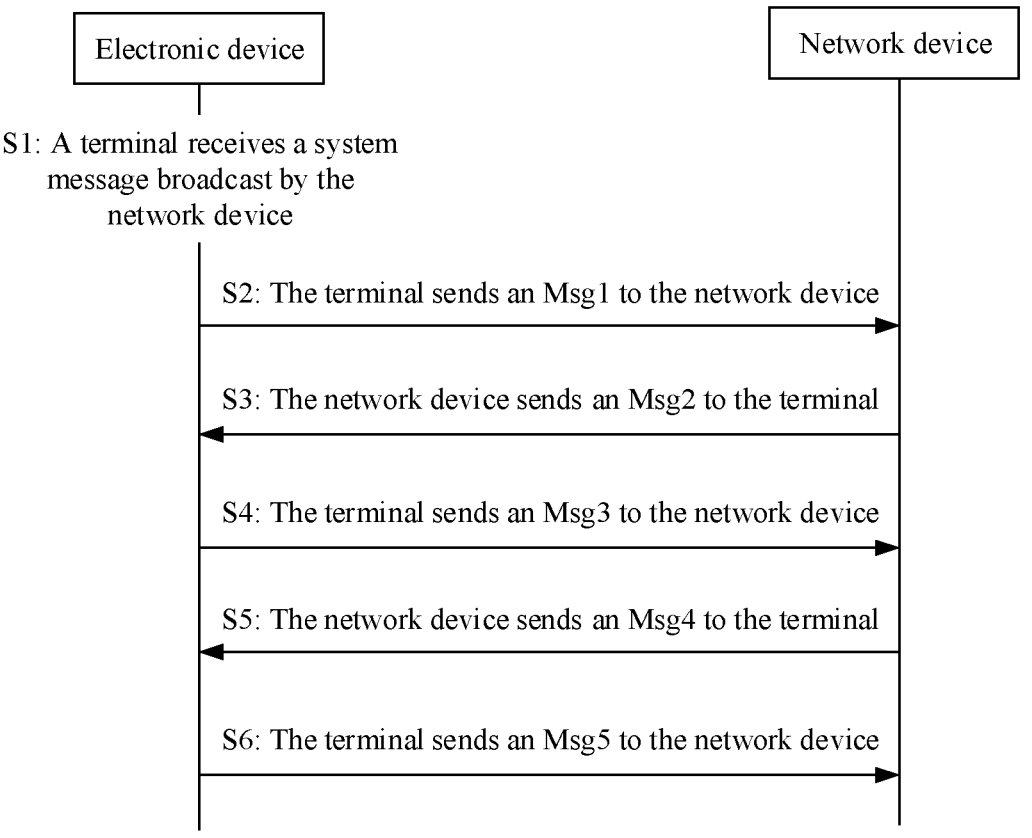
FIG. 3 is a schematic diagram of a random access procedure according to an embodiment of this application.

In a possible implementation, the electronic device may access the SUL by using a random access procedure shown in FIG. 3. Details are as follows:

S1. The electronic device receives a system information block broadcast by the network device.

Specifically, the electronic device may listen to a system information block (system information block, SIB) broadcast by the network device. Optionally, the system information block SIB includes common configuration information of the SUL. The common configuration information of the SUL includes one or more of frequency channel number information, a time alignment timer (time alignment timer, TAT), initial configuration information of a bandwidth part (bandwidth part, BWP), and the like of the SUL. The initial configuration information of the bandwidth part BWP includes basic configuration information of a random access channel (random access channel, RACH), a physical uplink control channel (physical uplink control channel, PUCCH), and a physical uplink shared channel (physical uplink shared channel, PUSCH). If an SUL frequency band supports a TDD transmission mode, the system information block SIB should include a corresponding uplink and downlink subframe configuration. If the SUL frequency band supports an FDD transmission mode, the system information block should include corresponding uplink and downlink frequency band bandwidth allocation. A root sequence number in the RACH configuration is used to determine a random access preamble (preamble), and time frequency information of the physical random access channel (physical random access channel, PRACH) is used to indicate a time frequency resource occupied by the PRACH.

S2. The electronic device sends an Msg1 to the network device.

Specifically, the electronic device may determine one random access preamble based on the root sequence number, and send the Msg1 on the time frequency resource indicated by the PRACH time frequency information in the system information block, to initiate random access. In this embodiment of this application, the electronic device sends the Msg1 to the network device, and it is considered that the electronic device initiates random access on the SUL.

S3. The network device sends an Msg2 to the electronic device.

Specifically, the Msg2 may be a random access response message (random access response, RAR), and the Msg2 includes an uplink timing advance (timing advance, TA) calculated by the network device for the electronic device.

S4. The electronic device sends an Msg3 to the network device.

Specifically, the electronic device may determine an uplink timing based on the TA, and the sending the Msg3 to the network device may be first scheduled UL transmission on UL-SCH, that is, data sent by the electronic device by using the uplink shared channel for the first time.

S5. The network device sends an Msg4 to the electronic device.

Specifically, the network device and the electronic device may finally complete contention resolution by using the Msg4. In addition, the Msg4 may carry dedicated (dedicated) configuration information of the SUL, and the dedicated configuration information may indicate specific configurations of the physical uplink control channel (physical uplink control channel, PUCCH), the physical uplink shared channel (physical uplink shared channel, PUSCH), the sounding reference signal (sounding reference signal, SRS), and the like of the SUL, for example, configurations of different formats of the PUCCH, a configuration of scrambling code, a pilot, and a codebook of the PUSCH, and a configuration of the SRS.

The electronic device may further perform uplink transmission based on common configuration information of the SUL and the dedicated configuration information of the SUL by using the SUL. The common configuration information of the SUL includes the uplink and downlink subframe configurations (if the SUL frequency band supports the TDD transmission mode) or the uplink and downlink frequency band bandwidth allocation (if the SUL frequency band supports the FDD transmission mode). Therefore, a spectrum in a frequency band used by the SUL can be flexibly used. In this way, not all timeslots in the SUL frequency band are used for uplink transmission, and an SUL configuration may be introduced for some symbols/slots, and an SUL operation may be supported. Optionally, the common configuration information of the SUL and the dedicated configuration information of the SUL may be two pieces of information necessary for the electronic device to perform uplink transmission on the SUL. The electronic device can perform the uplink transmission on the SUL only after obtaining the common configuration information of the SUL and the dedicated configuration information of the SUL from the access network device.

The Msg4 may be an RRC establishment message.

S6. The electronic device sends an Msg5 to the network device.

Specifically, the electronic device may further establish an RRC connection to the network device, and send an RRC setup complete message to the network device, for example, the Msg5 described in this embodiment of this application.

In another possible implementation, the electronic device may further access the SUL by using a contention-free random access procedure. For example, in the contention-free random access procedure, the electronic device sends the Msg1 to the network device to initiate a random access procedure. The electronic device receives the Msg2 from the network device, and it may be considered that the electronic device completes random access.

The foregoing describes the random access procedure of the electronic device in an idle state with reference to the steps S1 to S6. In a possible implementation, the electronic device in a connected state may receive a radio resource control (radio resource control, RRC) message from the network device, and the RRC message may carry the common configuration information of the SUL. After receiving the RRC message from the network device, the electronic device in the connected state needs to re-initiate random access. A random access procedure may be the same as the foregoing steps S1 to S5.

In this embodiment of this application, the electronic device may perform a contention-based random access process with reference to the procedure shown in FIG. 3. When receiving the Msg4 from the network device, it is considered that the electronic device completes random access on the SUL. Alternatively, if the electronic device completes sending of the Msg5, it is considered that the electronic device completes random access.

In the scenario shown in FIG. 2, in the current technology, a bandwidth defined as an SUL is generally used only for the SUL. That is, all slots of the bandwidth are used for uplink transmission. As shown in FIG. 3A, a second carrier is a carrier supporting the SUL, and all slots of the second carrier are configured as the SUL. A slot 0, a slot 1, a slot 2, and a slot 3 on the first carrier are used for normal downlink (normal downlink, NDL) transmission, and a slot 4 is used for NUL transmission.

However, to flexibly use the SUL, a TDD frequency band may also be configured to support the operation of the SUL. In addition, a downlink resource or another resource used for normal uplink may also be configured for the TDD frequency band. For example, refer to FIG. 3B. In time domain resources on the second carrier that supports the SUL, a time domain 3 is used for SUL transmission, resources in a time domain 0, a time domain 1, and a time domain 2 may be used for downlink transmission, and a resource in a time domain 4 may be used for uplink transmission. It can be learned that the electronic device may flexibly use the time domain resource of the second carrier that supports the SUL, that is, in the TDD frequency band, for all or some UL symbol/slot slot resources of a TDD uplink/downlink configuration of the electronic device, an SUL configuration is introduced and an SUL operation is supported. In some other cases, as shown in FIG. 5B, the carrier 2 may be further configured to perform carrier aggregation with the carrier 1. In this embodiment of this application, a base station can flexibly configure, by using a configuration message or another message, a carrier that supports the SUL.

For ease of understanding, the following provides several optional solutions provided in embodiments of this application.

Solution 1

Figure 4:
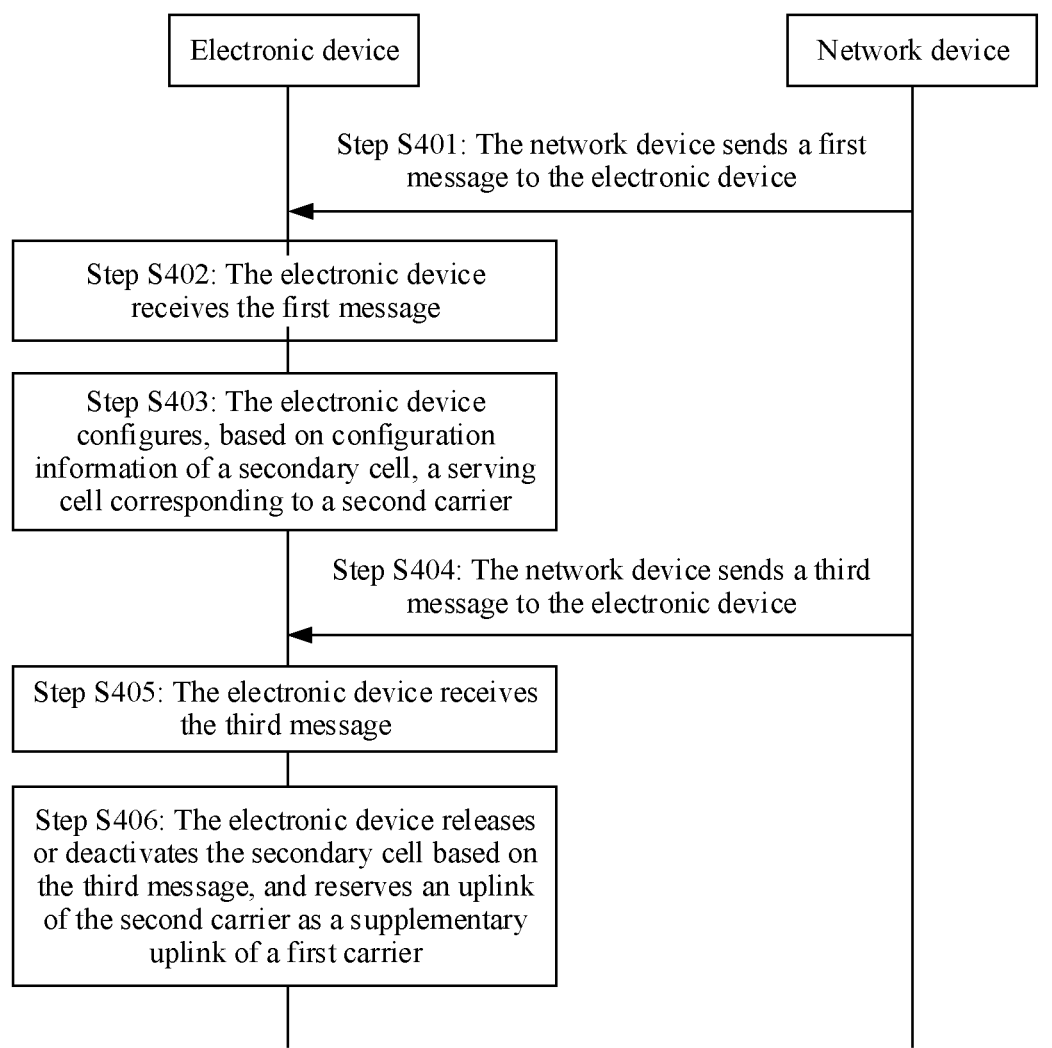
FIG. 4 is a flowchart of a carrier configuration method according to an embodiment of this application.

The following describes Solution 1 with reference to FIG. 4. FIG. 4 is a flowchart of a carrier configuration method according to an embodiment of this application. As shown in FIG. 4, the method includes but is not limited to the following steps.

Step S401: A network device sends a first message to an electronic device.

Specifically, a cell determined during initial access of the electronic device is used as a primary cell (Primary Cell, PCell). The electronic device establishes a radio resource control (Radio Resource Control, RRC) connection in the PCell, and performs initial call setup, RRC reconfiguration, cell handover, and the like in the PCell. A carrier corresponding to the PCell is a first carrier, and the network device communicates with the electronic device by using the first carrier. To improve an uplink coverage gain, a second carrier is configured for the first carrier by using broadcast information, and the configured second carrier is an SUL carrier of the first carrier. To improve a data transmission rate, the network device sends, to the electronic device, a first message including configuration information of a secondary cell (Secondary Cell, SCell). The SCell includes at least a serving cell corresponding to the second carrier.

The configuration information of the SCell includes carrier aggregation downlink configuration signaling and activation signaling.

Step S402: The electronic device receives the first message.

Specifically, the electronic device receives the first message sent by the network device, where the first message includes the configuration information of the secondary cell.

Step S403: The electronic device configures, based on the configuration information of the secondary cell, the serving cell corresponding to the second carrier.

Specifically, the configuration information of the SCell includes a downlink configuration of the second carrier, and the electronic device configures the downlink of the second carrier to be aggregated with the downlink of the first carrier based on the configuration information of the SCell.

In some embodiments, before the electronic device receives the first message sent by the network device, the network device may receive electronic device capability information sent by the electronic device, and the network device may determine, based on the electronic device capability information, whether the electronic device supports uplink carrier aggregation (UL CA). If the electronic device supports UL CA, in addition to the downlink configuration of the second carrier, the configuration information of the secondary cell received by the electronic device may further include an uplink configuration of the second carrier. If the electronic device does not support UL CA, the configuration information of the secondary cell received by the electronic device includes only the downlink configuration of the second carrier. In the foregoing case, the electronic device configures, based on the configuration information of the secondary cell, that an uplink of the second carrier remains as a supplementary uplink of the first carrier. In other words, the electronic device reserves SUL-related configuration information and operation on the second carrier.

Therefore, regardless of whether the electronic device supports or does not support UL CA, when configuring, based on configuration information of the secondary serving cell, the serving cell corresponding to the second carrier, the electronic device specifically configures the serving cell corresponding to the second carrier as a downlink of the second carrier for transmission with the first carrier in a carrier aggregation manner, and the uplink of the second carrier is transmitted as the supplementary uplink of the first carrier. A schematic diagram of a communication scenario between the electronic device and the network device is shown in FIG. 4A, and a schematic diagram of a working state is shown in FIG. 4B. It can be learned from FIG. 4A that downlink transmission is performed between the electronic device and the network device in the carrier aggregation manner, and uplink transmission is performed in an NUL/SUL manner. It should be noted that before the electronic device receives the configuration information including the secondary cell, a time domain resource on the second carrier is used for an SUL operation. After receiving the configuration information of the secondary cell, the electronic device performs the SUL operation on the resource that is on the second carrier and that is configured for SUL transmission. The SUL operation means that data scheduling and transmission are performed on an SUL carrier on a premise that an SUL configuration is stored. The SUL configuration refers to related configurations on the SUL, including PUSCH, PUCCH, PRACH, and SRS configurations of the SUL.

It can be learned from FIG. 4B that, downlink transmission is performed in a time domain 0, a time domain 1, and a time domain 2 on the first carrier and a time domain 0, a time domain 1, and a time domain 2 on the second carrier in a carrier aggregation manner, a time domain 3 on the first carrier is used for downlink transmission, and a time domain 4 on the first carrier is used for uplink transmission. A time domain 3 on the second carrier is used to perform SUL transmission, and a time domain 4 on the second carrier is a flexible time domain resource.

For example, a schematic diagram of a slot/symbol configuration of the second carrier is shown in FIG. 4C. An SCell configuration of the second carrier may carry configurations of a DL row slot/symbol and an SUL slot/symbol of the second carrier. It can be learned from FIG. 4C that the SCell has 10 slots in total, and the first seven slots, namely a slot 0, a slot 1, a slot 2, a slot 3, a slot 4, a slot 5, and a slot 6, are all D symbols/slots. The first six symbols/slots in the eighth slot, namely a slot 7, are downlink symbols/slots, the last four symbols/slots in the slot 7 are SUL symbols/slots, the middle four symbols/slots in the slot 7 are flexible symbols/slots, and the middle four symbols/slots of the slot 7 are used for the GP. The last two slots, namely a slot 8 and a slot 9, are all SUL symbols/slots.

When a downlink transmission configuration of the second carrier is to perform transmission with the first carrier in the carrier aggregation manner, and the resource that is on the second carrier and that is configured to perform SUL transmission is reserved, the SUL has a corresponding downlink frequency band. Therefore, the electronic device may receive a synchronization signal and data information of the second carrier on a downlink channel of the second carrier, use the synchronization signal and the data information as a downlink timing reference for sending an SUL on the second carrier, and calculate and configure an independent uplink sending timing advance (TA) for the SUL on the second carrier. The electronic device may further calculate a path loss of the uplink SUL of the second carrier based on downlink reference signal received power (RSRP) of the second carrier, and calculate and configure independent transmit power control for the SUL on the second carrier. Similarly, the electronic device may receive and sort RSRP of a synchronization signal block (SSB) or a channel status information reference signal (CSI-RS) of a downlink beam of the second carrier, and adjust a transmit beam of the SUL of the second carrier by using beam consistency.

Step S404: The network device sends a third message to the electronic device.

Specifically, the third message sent by the network device to the electronic device is used to indicate to release or deactivate the secondary cell, and the third message includes information about releasing the secondary cell or information about deactivating the secondary cell.

Step S405: The electronic device receives the third message.

Specifically, the electronic device receives the third message sent by the network device, where the third message includes the information about releasing the secondary cell or the information about deactivating the secondary cell.

Step S406: The electronic device releases or deactivates the secondary cell based on the third message, and reserves the uplink of the second carrier as the supplementary uplink of the first carrier.

Specifically, if the third message that is sent by the network device and that is received by the electronic device includes configuration information for releasing the secondary cell, the SCell is released based on the configuration information for releasing the secondary cell. For related descriptions of releasing the SCell, refer to section 5.3.10.3a in 3GPP TS 36.331 V11.1.0 (2019-09). Alternatively, if the third message that is sent by the network device and that is received by the electronic device includes configuration information for deactivating the secondary cell, the SCell is deactivated based on the configuration information for deactivating the secondary cell. Either deactivating or releasing the SCell indicates that no aggregation operation is performed on the first carrier and the second carrier of the electronic device. In other words, when the electronic device does not perform downlink transmission in a carrier aggregation manner by using the first carrier and the second carrier, the electronic device reserves the uplink of the second carrier as the supplementary uplink of the first carrier.

It should be noted that, the electronic device reserving the uplink of the second carrier as the supplementary uplink of the first carrier means that the electronic device reserves the SUL-related configuration information on the second carrier. In this case, a schematic diagram of a communication scenario between the electronic device and the network device is shown in FIG. 2, and a schematic diagram of a working state is shown in FIG. 3B. It may be understood that a communication manner between the electronic device and the network device falls back from that shown in FIG. 4A to that shown in FIG. 2, and correspondingly, a working state between the electronic device and the network device falls back from that shown in FIG. 4B to that shown in FIG. 3B.

Solution 2

Figure 5:
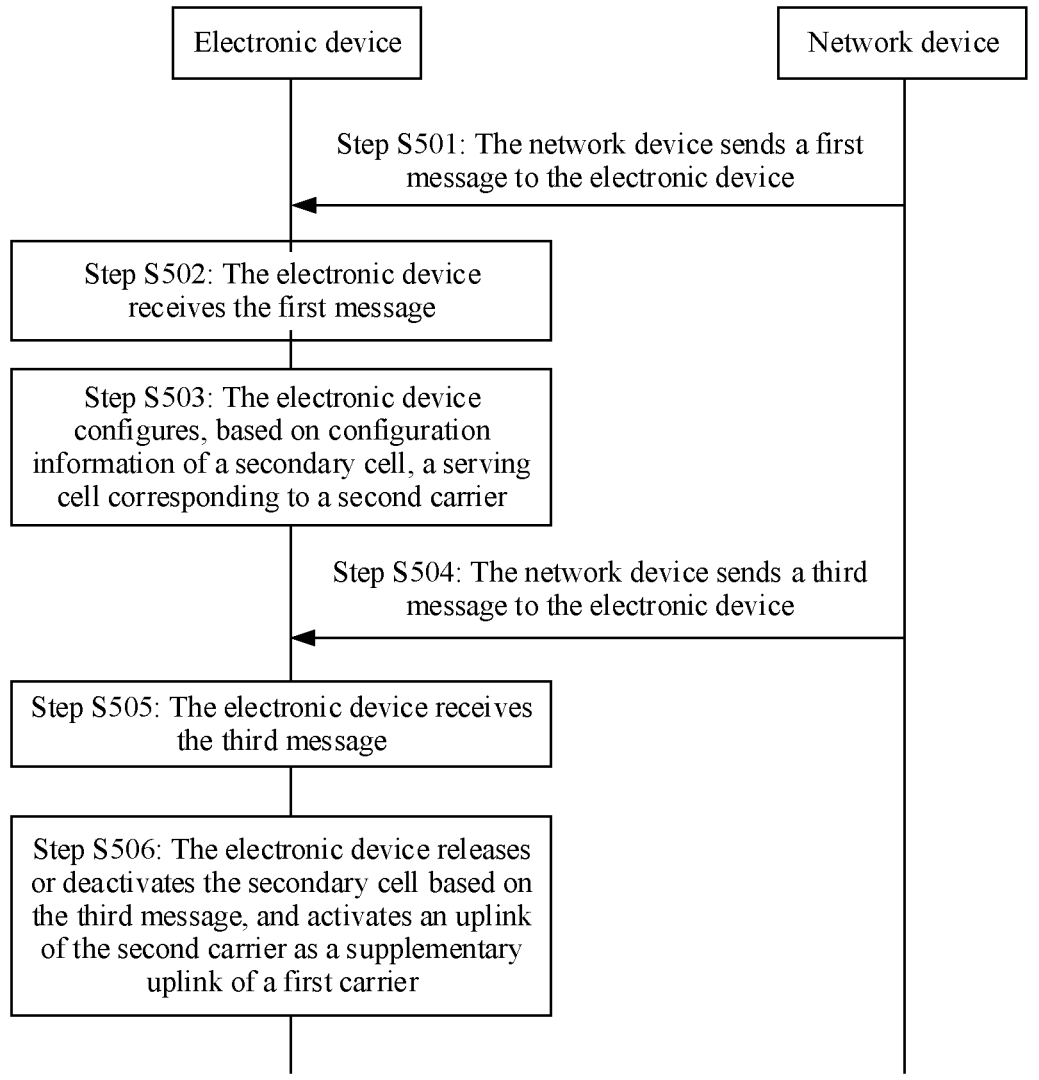
FIG. 5 is a flowchart of another carrier configuration method according to an embodiment of this application.

The following describes Solution 2 with reference to FIG. 5. FIG. 5 is a carrier configuration method according to an embodiment of this application. As shown in FIG. 5, the method includes but is not limited to the following steps.

Step S501: A network device sends a first message to an electronic device.

Specifically, for detailed descriptions, refer to step S401.

Step S502: The electronic device receives the first message.

Specifically, for detailed descriptions, refer to step S402.

Step S503: The electronic device configures, based on configuration information of a secondary cell, a serving cell corresponding to a second carrier.

Specifically, the configuration information of the SCell includes a downlink configuration of the second carrier, and the electronic device configures a downlink of the second carrier to be aggregated with a downlink of a first carrier based on the configuration information of the SCell.

In some embodiments, before the electronic device receives the first message sent by the network device, the network device may receive electronic device capability information sent by the electronic device, and the network device may determine, based on the electronic device capability information, whether the electronic device supports uplink carrier aggregation (UL CA).

If the electronic device supports UL CA, in addition to the downlink configuration of the second carrier, the configuration information of the secondary cell received by the electronic device further includes an uplink configuration of the second carrier. Therefore, the electronic device deactivates a supplementary uplink of the second carrier based on the configuration information of the secondary serving cell, and configures an uplink of the second carrier to be aggregated with an uplink of the first carrier. That is, the second carrier is changed from a configured SUL of the first carrier to a deactivated SUL, and is transmitted with the uplink of the first carrier in an aggregation manner.

A schematic diagram of a communication scenario between the electronic device and the network device is shown in FIG. 5A, and a schematic diagram of a working state is shown in FIG. 5B. It can be learned from FIG. 5A that downlink transmission is performed between the electronic device and the network device by aggregating the first carrier and the second carrier, regular uplink transmission is further performed on the first carrier, and uplink transmission is further performed between the first carrier and a resource that is on the second carrier and that is configured as a deactivated SUL. It can be learned from FIG. 5B that, downlink transmission is performed between a time domain 0, a time domain 1, and a time domain 2 on the first carrier and a time domain 0, a time domain 1, and a time domain 2 on the second carrier in a carrier aggregation manner. A time domain 3 on the first carrier is used for downlink transmission, and a time domain 4 on the first carrier is used for uplink transmission. A time domain 3 on the second carrier is a deactivated SUL, and transmission is performed between the time domain 3 and the uplink of the first carrier in an aggregation manner. A time domain 4 on the second carrier is a flexible time domain resource.

If the electronic device does not support UL CA, the configuration information of the secondary cell received by the electronic device includes only the downlink configuration of the second carrier. Therefore, the electronic device deactivates the uplink of the second carrier based on the configuration information of the secondary cell, and transmission is not performed on the uplink of the second carrier. In other words, the second carrier is changed from the SUL of the first carrier to a deactivated SUL, and transmission is not performed by using the uplink of the second carrier.

A schematic diagram of a communication scenario between the electronic device and the network device is shown in FIG. 5C, and a schematic diagram of a working state is shown in FIG. 5D. It can be learned from FIG. 5C that downlink transmission is performed between the electronic device and the network device by aggregating the first carrier and the second carrier, regular uplink transmission is further performed on the first carrier, and some slots of the second carrier are a deactivated SUL of the first carrier. It can be learned from FIG. 5D that, downlink transmission is performed between the time domain 0, the time domain 1, and the time domain 2 on the first carrier and the time domain 0, the time domain 1, and the time domain 2 on the second carrier in a carrier aggregation manner. The time domain 3 on the first carrier is used for downlink transmission, and the time domain 3 on the second carrier is a deactivated SUL. The time domain 4 on the first carrier is uplink transmission, and the time domain 4 on the second carrier is a flexible time domain resource. When the SUL is deactivated, the electronic device does not perform PRACH sending, SRS sending, PUCCH sending, or PUSCH (UL-SCH) sending on the SUL. When the uplink transmission configuration of the second carrier is a deactivated SUL, a random access procedure that is being performed on the SUL is terminated, but NUL transmission is not affected.

Step S504: The network device sends a third message to the electronic device.

Specifically, for detailed descriptions, refer to step S403.

Step S505: The electronic device receives the third message.

Specifically, for detailed descriptions, refer to step S405.

Step S506: The electronic device releases or deactivates the secondary cell based on the third message, and reserves the uplink of the second carrier as a supplementary uplink of the first carrier.

Specifically, if the third message that is sent by the network device and that is received by the electronic device includes configuration information for releasing the secondary cell, the SCell is released based on the configuration information for releasing the secondary cell. For related descriptions of releasing the SCell, refer to section 5.3.10.3a in 3GPP TS 36.331 V11.1.0 (2019-09). Alternatively, if the third message that is sent by the network device and that is received by the electronic device includes configuration information for deactivating the secondary cell, the SCell is deactivated based on the configuration information for deactivating the secondary cell. Either deactivating or releasing the SCell indicates that the first carrier and the second carrier of the electronic device are no longer aggregated. In other words, when the electronic device does not perform downlink transmission in a carrier aggregation manner by using the first carrier and the second carrier, the electronic device activates the uplink of the second carrier as the supplementary uplink of the first carrier. It should be noted that, the electronic device activates the uplink of the second carrier as the supplementary uplink of the first carrier, that is, activates SUL-related configuration information on the second carrier, and switches the second carrier from an SUL deactivated state to an SUL activated state.

In this case, a schematic diagram of a communication scenario between the electronic device and the network device is shown in FIG. 2, and a schematic diagram of a working state is shown in FIG. 3A. It may be understood that communication between the electronic device and the network device falls back from the manner shown in FIG. 5A or FIG. 5C to the manner shown in FIG. 2. Correspondingly, a working status between the electronic device and the network device falls back from the state shown in FIG. 5B or FIG. 5D to the state shown in FIG. 3B.

Solution 3

Figure 6:
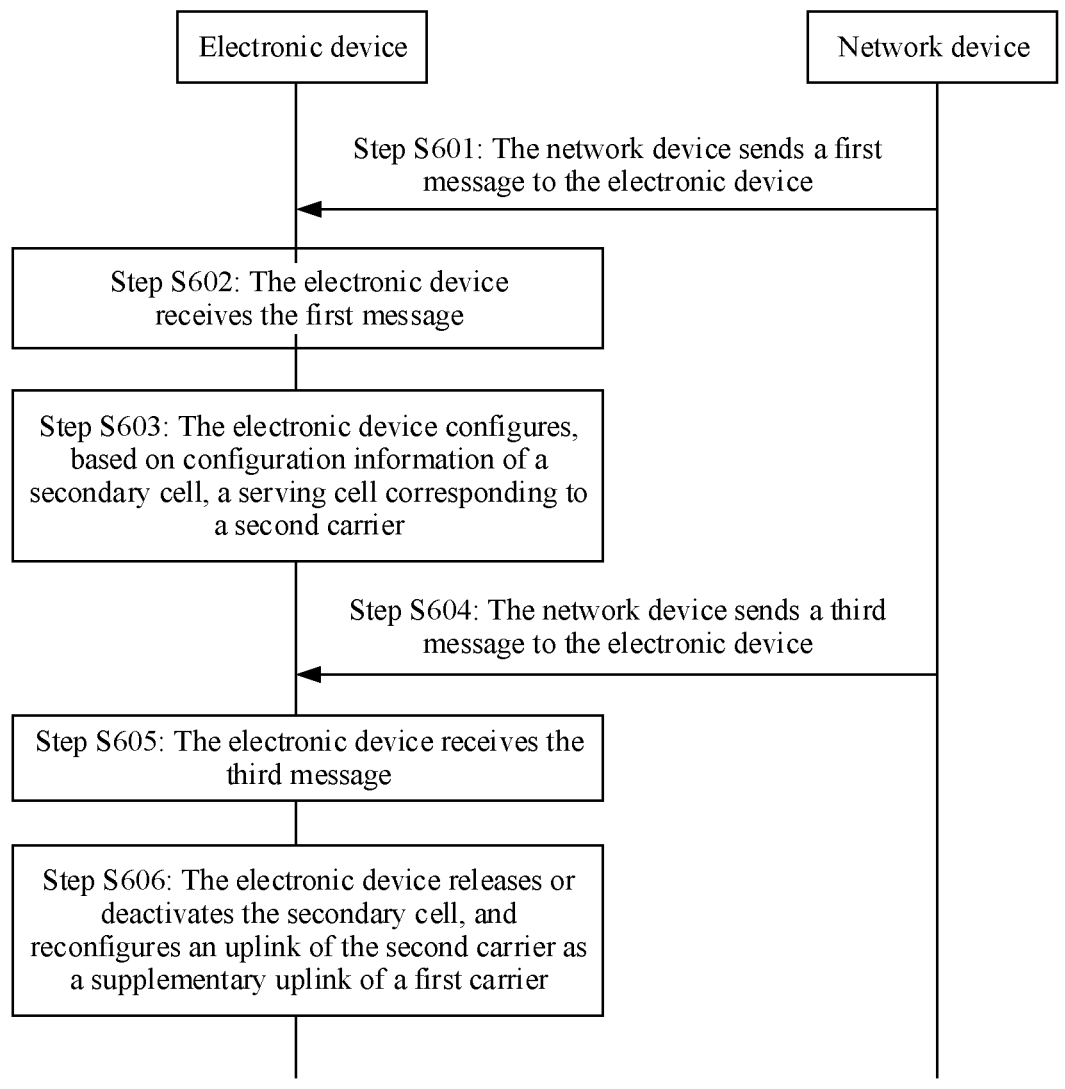
FIG. 6 is a flowchart of another carrier configuration method according to an embodiment of this application.

The following describes Solution 3 with reference to FIG. 6. FIG. 6 is a flowchart of a carrier configuration method according to an embodiment of this application. As shown in FIG. 6, the method includes but is not limited to the following steps.

Step S601: A network device sends a first message to an electronic device.

Specifically, for detailed descriptions, refer to step 401.

Step S602: The electronic device receives the first message.

Specifically, for detailed descriptions, refer to step 402.

Step S603: The electronic device configures, based on configuration information of a secondary cell, a serving cell corresponding to a second carrier.

Specifically, the configuration information of the SCell includes a downlink configuration of the second carrier, and the electronic device configures a downlink of the second carrier to be aggregated with a downlink of a first carrier based on the configuration information of the SCell.

In some embodiments, before the electronic device receives the first message sent by the network device, the network device may receive electronic device capability information sent by the electronic device, and the network device may determine, based on the electronic device capability information, whether the electronic device supports uplink carrier aggregation (UL CA). If the electronic device supports UL CA, in addition to the downlink configuration of the second carrier, the configuration information of the secondary cell received by the electronic device further includes an uplink configuration of the second carrier. Therefore, the electronic device configures, based on configuration information of the secondary cell, an uplink of the second carrier to be aggregated with an uplink of the first carrier.

A schematic diagram of a communication scenario between the electronic device and the network device is shown in FIG. 6A, and a schematic diagram of a working state is shown in FIG. 6B. It can be learned from FIG. 6A that downlink transmission is performed between the electronic device and the network device by aggregating the first carrier and the second carrier, and uplink transmission is further performed by aggregating the first carrier and the second carrier. It can be learned from FIG. 6B that downlink transmission is performed in a carrier aggregation manner between a time domain 0, a time domain 1, and a time domain 2 on the first carrier and a time domain 0, a time domain 1, and a time domain 2 on the second carrier. Uplink transmission is performed on a time domain 3 on the first carrier and a time domain 3 on the second carrier in a carrier aggregation manner. A time domain 4 on the first carrier is used for uplink transmission, and a time domain 4 on the second carrier is a flexible time domain resource.

Step S604: The network device sends a third message to the electronic device.

Specifically, for detailed descriptions, refer to step S403.

Step S605: The electronic device receives the third message.

Specifically, for detailed descriptions, refer to step 405.

Step S606: The electronic device releases or deactivates the secondary cell, and reconfigures the uplink of the second carrier as a supplementary uplink of the first carrier.

Specifically, if the third message that is sent by the network device and that is received by the electronic device includes configuration information for releasing the secondary cell, the SCell is released based on the configuration information for releasing the secondary cell. For related descriptions of releasing the SCell, refer to section 5.3.10.3a in 3GPP TS 36.331 V11.1.0 (2019-09). Alternatively, if the third message that is sent by the network device and that is received by the electronic device includes configuration information for deactivating the secondary cell, the SCell is deactivated based on the configuration information for deactivating the secondary cell. Either deactivating the SCell or releasing the SCell indicates that the first carrier and the second carrier of the electronic device are no longer aggregated. In other words, when the electronic device does not perform downlink transmission in a carrier aggregation manner by using the first carrier and the second carrier, the electronic device reconfigures the uplink of the second carrier as the supplementary uplink of the first carrier.

It should be noted that, the electronic device reconfigures the uplink of the second carrier as the supplementary uplink of the first carrier, that is, reconfigures an uplink configuration related to carrier aggregation on the second carrier as an SUL configuration. In this case, a schematic diagram of a communication scenario between the electronic device and the network device is shown in FIG. 2, and a schematic diagram of a working state is shown in FIG. 3B. It may be understood that a communication manner between the electronic device and the network device falls back from the manner shown in FIG. 6A to the manner shown in FIG. 2. Correspondingly, a working status between the electronic device and the network device falls back from the state shown in FIG. 6B to the state shown in FIG. 3B.

Solution 4

Figure 7:
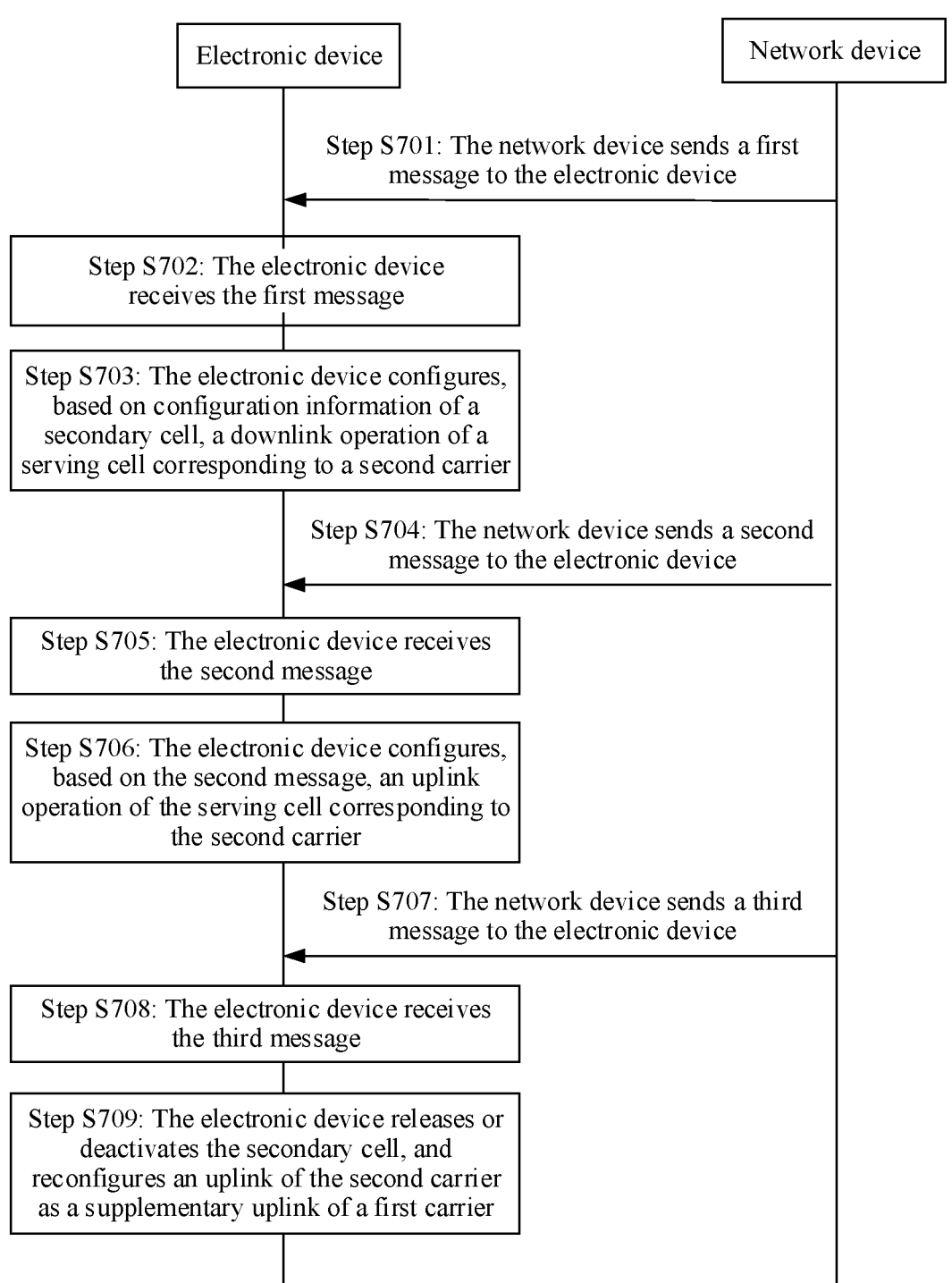
FIG. 7 is a flowchart of another carrier configuration method according to an embodiment of this application.

The following describes Solution 4 with reference to FIG. 7. FIG. 7 is a flowchart of a carrier configuration method according to an embodiment of this application. As shown in FIG. 7, the method includes but is not limited to the following steps.

Step S701: A network device sends a first message to an electronic device.

Specifically, for detailed descriptions, refer to step 401.

Step S702: The electronic device receives the first message.

Specifically, for detailed descriptions, refer to step 402.

Step S703: The electronic device configures, based on configuration information of a secondary cell, a downlink operation of a serving cell corresponding to a second carrier.

Specifically, the configuration information of the SCell includes a downlink configuration of the second carrier, and the downlink configuration of the second carrier is used to indicate to configure a downlink of the second carrier to be aggregated with a downlink of a first carrier.

In some embodiments, before the electronic device receives the first message sent by the network device, the network device may receive electronic device capability information sent by the electronic device, and the network device may determine, based on the electronic device capability information, whether the electronic device supports uplink carrier aggregation (UL CA). If the electronic device supports UL CA, in addition to the downlink configuration of the second carrier, the configuration information of the secondary cell received by the electronic device further includes an uplink configuration of the second carrier. If the electronic device does not support UL CA, the configuration information of the secondary cell received by the electronic device includes only the downlink configuration of the second carrier. Regardless of whether the configuration information of the secondary cell received by the electronic device includes the downlink configuration of the second carrier, the electronic device configures, based on the configuration information of the secondary cell, the downlink operation of the serving cell corresponding to the second carrier as aggregating with the downlink of the first carrier.

Step S704: The network device sends a second message to the electronic device.

Specifically, the second message is used to indicate to configure the serving cell corresponding to the second carrier, and configuring the serving cell corresponding to the second carrier may specifically include: An uplink of the second carrier remains as a supplementary uplink of the first carrier, or an uplink of the second carrier is deactivated, or an uplink of the second carrier is aggregated with an uplink of the first carrier.

The second message includes first MAC CE signaling or first DCI signaling. Both of the first MAC CE signaling and the first DCI signaling include a 2-bit uplink operation parameter, and a specific value of the 2-bit uplink operation parameter is 00, 01, 10, or 11.

Step S705: The electronic device receives the second message.

Specifically, the electronic device receives the second message sent by the network device, where the second message includes the first MAC CE signaling or the first DCI signaling.

Step S706: The electronic device configures, based on the second message, an uplink operation of the serving cell corresponding to the second carrier.

Specifically, the second message received by the electronic device includes the first MAC CE signaling or the first DCI signaling, and based on a specific value of a parameter in the first MAC CE signaling or the first DCI signaling, the uplink operation of the serving cell corresponding to the second carrier may be configured.

Optionally, the second message received by the electronic device includes the first MAC CE signaling, and the first MAC CE signaling includes a 2-bit uplink transmission media access control element (UL transmission MAC CE, $UL_iT$), where i is a positive integer and indicates a quantity of carriers. A value of the $UL_iT$ is used to indicate the uplink operation of the serving cell corresponding to the second carrier. A value of the 2-bit $UL_iT$ may be 00, 01, 10, or 11. For example, a value 00 of the $UL_iT$ may be used to indicate that the uplink of the second carrier is configured not to perform transmission; a value 01 of the $UL_iT$ may be used to indicate that a resource for SUL transmission is reserved; a value 10 of the $UL_iT$ may be used to indicate to deactivate the uplink of the second carrier and configure the uplink of the second carrier to be aggregated with the uplink of the first carrier; and a value 11 of the $UL_iT$ may be used to indicate to configure the SUL and configure the uplink of the second carrier to be aggregated with the uplink of the first carrier. It should be noted that the uplink operation corresponding to the value of the $UL_iT$ is an example of this embodiment of this application, and may not be limited to those listed in this embodiment of this application.

Figure 7A:
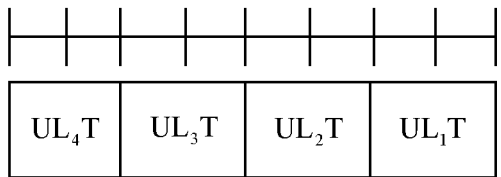
FIG. 7A is a schematic diagram of an uplink operation indicated by $UL_iT$ according to an embodiment of this application.

FIG. 7A is a schematic diagram of an uplink operation indicated by the $UL_iT$. The value of the $UL_2T$ is used to indicate an uplink transmission manner of the serving cell corresponding to the second carrier. The second message received by the electronic device includes the first MAC CE signaling.

When the value of the $UL_2T$ included in the first MAC CE signaling is 01, the electronic device reserves a configuration and an operation that are related to the SUL and that are on the second carrier, that is, the uplink of the second carrier remains as the supplementary uplink of the first carrier. A schematic diagram of a communication scenario between the electronic device and the network device is shown in FIG. 4A, and a schematic diagram of a working state is shown in FIG. 4B.

When the value of $UL_2T$ included in the first MAC CE signaling is 10, the electronic device deactivates the uplink of the second carrier, and configures the uplink of the second carrier to be aggregated with the uplink of the first carrier. A schematic diagram of a communication scenario between the electronic device and the network device is shown in FIG. 5A, and a schematic diagram of a working state is shown in FIG. 5B.

When the value of the $UL_2T$ included in the first MAC CE signaling is 11, the electronic device configures the SUL, and configures the uplink of the second carrier to be aggregated with the uplink of the first carrier. In this case, a schematic diagram of a communication scenario between the electronic device and the network device is shown in FIG. 6A, and a schematic diagram of a working state is shown in FIG. 6B.

Optionally, the second message received by the electronic device includes first downlink control information (Downlink Control Information, DCI) signaling. DCI formats 0_0 and 0_1 include a 2-bit uplink transmission indicator (UL transmission indicator), and the UL transmission indicator is used to indicate an uplink transmission manner of the serving cell corresponding to the second carrier. The value of the 2-bit UL transmission indicator may be 00, 01, 10, or 11. When no SUL is configured, the UL transmission indicators in the DCI formats 0_0 and 0_1 are 0 bits. When there is an SUL configuration, the UL transmission indicators in the DCI formats 0_0 and 0_1 are 2 bits. It should be noted that the uplink operation corresponding to the value of the UL transmission indicator is an example in this embodiment of this application, and may not be limited to those listed in this embodiment of this application.

When the value of the UL transmission indicators in the DCI formats 0_0 and 0_1 are 01, the electronic device reserves a configuration and an operation that are related to the SUL and that are on the second carrier, that is, the uplink of the second carrier remains as the supplementary uplink of the first carrier. A schematic diagram of a communication scenario between the electronic device and the network device is shown in FIG. 4A, and a schematic diagram of a working state is shown in FIG. 4B.

When the value of the UL transmission indicators in the DCI formats 0_0 and 0_1 are 10, the electronic device deactivates the uplink of the second carrier, and configures the uplink of the second carrier to be aggregated with the uplink of the first carrier. A schematic diagram of a communication scenario between the electronic device and the network device is shown in FIG. 5A, and a schematic diagram of a working state is shown in FIG. 5B.

When the value of the UL transmission indicators in the DCI formats 0_0 and 0_1 are 11, the electronic device configures the SUL, and configures the uplink of the second carrier to be aggregated with the uplink of the first carrier. In this case, a schematic diagram of a communication scenario between the electronic device and the network device is shown in FIG. 6A, and a schematic diagram of a working state is shown in FIG. 6B.

Figure 7B:
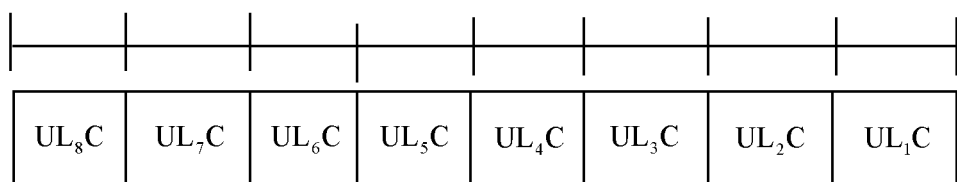
FIG. 7B is a schematic diagram of an uplink operation indicated by $UL_iT$ according to an embodiment of this application.

Optionally, a 1-bit uplink transmission media access control element (UL transmission MAC CE, $UL_iC$) is defined in second MAC CE signaling, where i is a positive integer and indicates a quantity of carriers. FIG. 7B is a schematic diagram of an indication of an uplink operation indicated by the $UL_iC$. A value of the $UL_iC$ is used to indicate an uplink operation on a carrier, and the $UL_iC$ may indicate transmission on a plurality of carriers. The value of the 1-bit $UL_iC$ may be 0 or 1.

The value of the 1-bit UL transmission MAC CE may specifically include the following several cases: Case 1: A value 0 of the $UL_iC$ may be used to indicate that the uplink of the second carrier remains as the supplementary uplink of the first carrier, and a value 1 of the $UL_iC$ may be used to indicate that the uplink of the second carrier is deactivated. Case 2: A value 0 of the $UL_iC$ may be used to indicate that the uplink of the second carrier remains as the supplementary uplink of the first carrier, and a value 1 of the $UL_iC$ may be used to indicate aggregation between the uplink of the second carrier and the uplink of the first carrier. Case 3: A value 0 of the $UL_iC$ may be used to indicate aggregation between the uplink of the second carrier and the uplink of the first carrier, and a value 1 of the $UL_iC$ may be used to indicate that the uplink of the second carrier is deactivated. It should be noted that the uplink operation corresponding to the value of the $UL_iC$ is an example of this embodiment of this application, and may not be limited to those listed in this embodiment of this application. For example, in Case 1, the value 1 of the $UL_iC$ may be used to indicate that an uplink of the second carrier remains as a supplementary uplink of the first carrier, and the value 1 of the $UL_iC$ may be used to indicate that the uplink of the second carrier is deactivated.

Optionally, first indication information received by the electronic device includes second downlink control information (Downlink Control Information, DCI) signaling. DCI formats 0_0 and 0_1 include a 1-bit uplink transmission indicator (UL transmission indicator) used to indicate an uplink operation of the second carrier. A value of the 1-bit UL transmission indicator is 0 or 1. When no SUL is configured, the UL transmission indicator in the DCI formats 0_0 and 0_1 is 0 bits. When there is a configured SUL, the UL transmission indicator in the DCI formats 00 and 0_1 is 1 bit.

The value of the 1-bit UL transmission indicator may specifically include the following several cases.

Case 1: A value 0 of the UL transmission indicator may be used to indicate that the uplink of the second carrier remains as the supplementary uplink of the first carrier, and a value 1 of the UL transmission indicator may be used to indicate that the uplink of the second carrier is deactivated.

Case 2: A value 0 of the UL transmission indicator may be used to indicate that the uplink of the second carrier remains as the supplementary uplink of the first carrier, and a value 1 of the UL transmission indicator may be used to indicate aggregation between the uplink of the second carrier and the uplink of the first carrier.

Case 3: A value 0 of the UL transmission indicator may be used to indicate aggregation between the uplink of the second carrier and the uplink of the first carrier, and a value 1 of the $UL_iC$ may be used to indicate that the uplink of the second carrier is deactivated.

It should be noted that the uplink operation corresponding to the value of the UL transmission indicator is an example of this embodiment of this application, and may not be limited to that listed in this embodiment of this application. For example, in Case 1, a value 1 of the UL transmission indicator may be used to indicate that the uplink of the second carrier remains as the supplementary uplink of the first carrier, and a value 1 of the UL transmission indicator may be used to indicate that the uplink of the second carrier is deactivated.

Step S707: The network device sends a third message to the electronic device.

Specifically, for detailed descriptions, refer to step S403.

Step S708: The electronic device receives the third message.

Specifically, for detailed descriptions, refer to step S605.

Step S709: The electronic device releases or deactivates the secondary cell, and reconfigures the uplink of the second carrier as the supplementary uplink of the first carrier.

Specifically, for detailed descriptions, refer to step S606.

Solution 5

Figure 8:
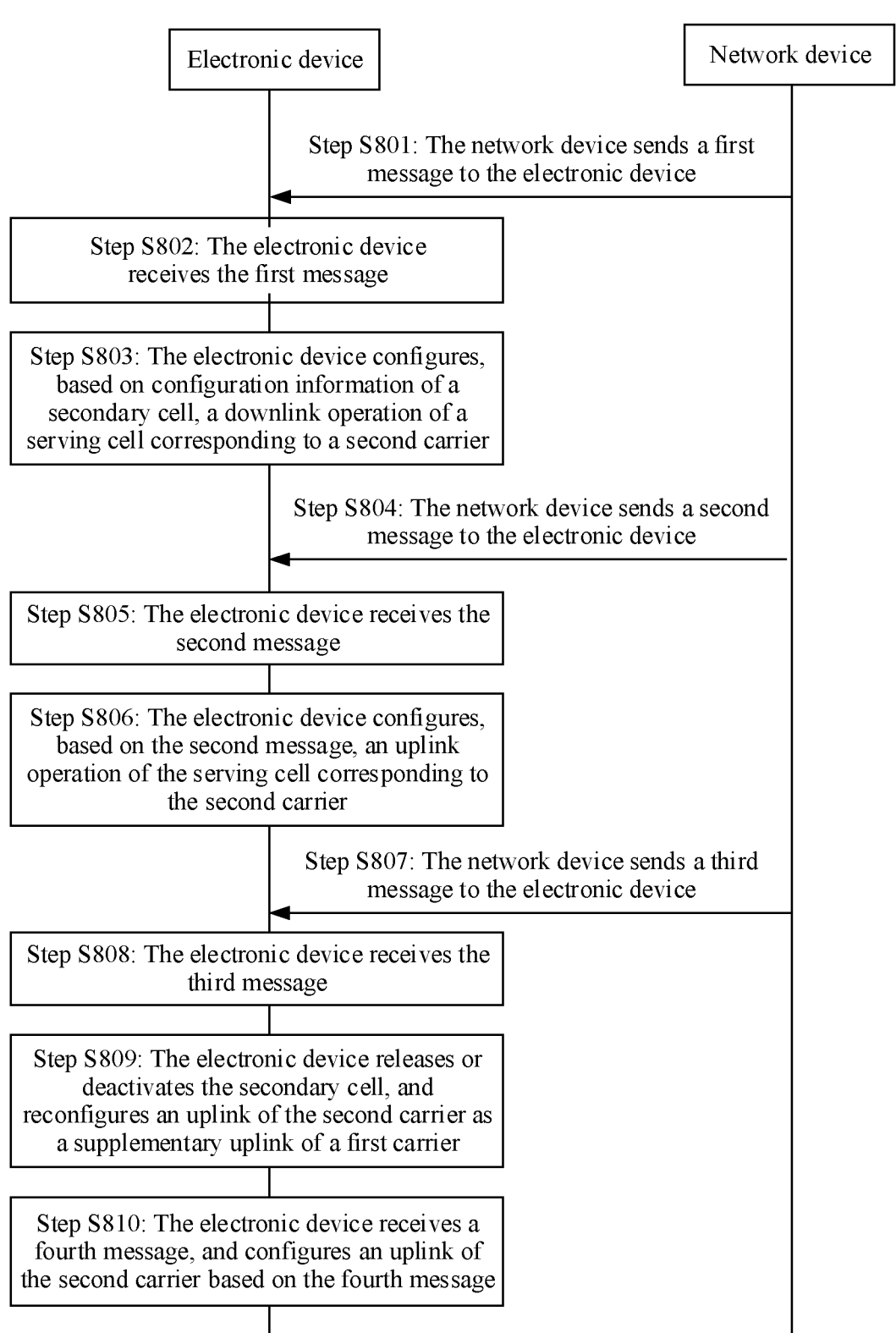
FIG. 8 is a flowchart of another carrier configuration method according to an embodiment of this application.

The following describes Solution 5 with reference to FIG. 8. FIG. 8 is a flowchart of a carrier configuration method according to an embodiment of this application. As shown in FIG. 8, the method includes but is not limited to the following steps.

Step S801: A network device sends a first message to an electronic device.

Specifically, for detailed descriptions, refer to step 401.

Step S802: The electronic device receives the first message.

Specifically, for detailed descriptions, refer to step S402.

Step S803: The electronic device configures, based on configuration information of a secondary cell, a downlink operation of a serving cell corresponding to a second carrier.

Specifically, for detailed descriptions, refer to step 703.

Step S804: The network device sends a second message to the electronic device.

Specifically, for detailed descriptions, refer to step 704.

Step S805: The electronic device receives the second message.

Specifically, for detailed descriptions, refer to step 705.

Step S806: Configure an uplink operation of the serving cell corresponding to the second carrier based on the second message.

Specifically, for detailed descriptions, refer to step S706.

Step S807: The network device sends a third message to the electronic device.

Specifically, for detailed descriptions, refer to step S404.

Step S808: The electronic device receives the third message.

Specifically, for detailed descriptions, refer to step S708.

Step S809: The electronic device releases or deactivates the secondary cell based on the third message.

Specifically, if the third message that is sent by the network device and that is received by the electronic device includes configuration information for releasing the secondary cell, the SCell is released based on the configuration information for releasing the secondary cell. For related descriptions of releasing the SCell, refer to section 5.3.10.3a in 3GPP TS 36.331 V11.1.0 (2019-09). Alternatively, if the third message that is sent by the network device and that is received by the electronic device includes configuration information for deactivating the secondary cell, the SCell is deactivated based on the configuration information for deactivating the secondary cell. Either deactivating or releasing the SCell indicates that downlink aggregation is no longer performed on a first carrier and the second carrier of the electronic device. In other words, the electronic device does not perform downlink transmission in a carrier aggregation manner by using the first carrier and the second carrier.

Step S810: The electronic device receives a fourth message, and configures an uplink of the second carrier based on the fourth message.

Specifically, the fourth message received by the electronic device includes second MAC CE signaling or second DCI signaling, and based on a specific value of a parameter in the second MAC CE signaling or the second DCI signaling, an uplink operation of the second carrier is configured.

Optionally, the fourth message received by the electronic device includes the second MAC CE signaling, and the second MAC CE signaling includes a 2-bit UL transmission MAC CE, where i is a positive integer, and indicates a quantity of carriers. A value of the UL transmission MAC CE is used to indicate the uplink operation of the serving cell corresponding to the second carrier. A value of the 2-bit UL transmission MAC CE may be 00, 01, 10, or 11. For example, a value 00 of the UL transmission MAC CE may be used to indicate that the uplink of the second carrier is configured not to perform transmission; a value 01 of the UL transmission MAC CE may be used to indicate that the uplink of the second carrier is reserved as a supplementary uplink of the first carrier; a value 10 of the UL transmission MAC CE may be used to indicate that the uplink of the second carrier is activated as a supplementary uplink of the first carrier; and a value 11 of the UL transmission MAC CE may be used to indicate that the uplink of the second carrier is reconfigured as a supplementary uplink of the first carrier. It should be noted that the uplink operation corresponding to the value of the UL transmission MAC CE is an example of this embodiment of this application, and may not be limited to those listed in this embodiment of this application.

For example, before the electronic device receives the third message to release or deactivate the secondary serving cell, if the uplink of the second carrier is the supplementary uplink of the first carrier, the value of UL transmission MAC CE in the second MAC CE signaling included in the fourth message received by the electronic device may be 01, and the electronic device reserves the uplink of the second carrier as the supplementary uplink of the first carrier, that is, reserves SUL-related configuration information on the second carrier. In this case, a schematic diagram of a communication scenario between the electronic device and the network device is shown in FIG. 2, and a schematic diagram of a working state is shown in FIG. 3A. It may be understood that communication between the electronic device and the network device falls back from the manner shown in FIG. 4A to the manner shown in FIG. 2. Correspondingly, a working state between the electronic device and the network device falls back from the manner shown in FIG. 4B to that shown in FIG. 3A.

If the uplink of the second carrier is a deactivated SUL, and uplink aggregation is performed between the second carrier and the first carrier, the value of the UL transmission MAC CE in the second MAC CE signaling included in the second message received by the electronic device may be 10, and the electronic device activates the uplink of the second carrier as the supplementary uplink of the first carrier. That is, the SUL-related configuration information on the second carrier is activated, and the second carrier is converted into the SUL of the first carrier by transmitting the second carrier by deactivating the SUL and aggregating with the uplink of the first carrier. In this case, a schematic diagram of a communication scenario between the electronic device and the network device is shown in FIG. 2, and a schematic diagram of a working state is shown in FIG. 3A. It may be understood that communication between the electronic device and the network device falls back from the manner shown in FIG. 5A to the manner shown in FIG. 2. Correspondingly, a working state between the electronic device and the network device falls back from the manner shown in FIG. 5B to that shown in FIG. 3A.

If the uplink of the second carrier is aggregated with the uplink of the first carrier, the value of the UL transmission MAC CE in the second MAC CE signaling included in the second message received by the electronic device may be 11, and the electronic device reconfigures the uplink of the second carrier as the supplementary uplink of the first carrier, that is, reconfigures an uplink configuration related to carrier aggregation on the second carrier as an SUL configuration. In this case, a schematic diagram of a communication scenario between the electronic device and the network device is shown in FIG. 2, and a schematic diagram of a working state is shown in FIG. 3A. It may be understood that communication between the electronic device and the network device falls back from the manner shown in FIG. 6A to the manner shown in FIG. 2. Correspondingly, a working state between the electronic device and the network device falls back from the manner shown in FIG. 6B to that shown in FIG. 3A.

Optionally, the fourth message received by the electronic device includes second DCI signaling, DCI formats 0_0 and 0_1 include a 2-bit UL transmission indicator, and the UL transmission indicator is used to indicate an uplink transmission manner of the serving cell corresponding to the second carrier. A value of the 2-bit UL transmission indicator may be 00, 01, 10, or 11. For example, a value 00 of the UL transmission indicator in the DCI formats 0_0 and 0_1 may be used to indicate that the uplink of the second carrier is configured not to perform transmission; a value 01 of the UL transmission indicator in the DCI formats 0_0 and 0_1 may be used to indicate that a resource for SUL transmission is reserved; a value 10 of the UL transmission indicator in the DCI formats 0_0 and 0_1 may be used to indicate that the uplink of the second carrier is activated as the supplementary uplink of the first carrier; and a value 11 of the UL transmission indicator in the DCI formats 0_0 and 0_1 may be used to indicate that the uplink of the second carrier is reconfigured as the supplementary uplink of the first carrier. It should be noted that the uplink operation corresponding to the value of the UL transmission indicator in the DCI formats 0_0 and 0_1 is an example of this embodiment of this application, and may not be limited to that listed in this embodiment of this application.

For example, before the electronic device receives the third message to release or deactivate the secondary serving cell, if the uplink of the second carrier is the supplementary uplink of the first carrier, for specific descriptions of the second DCI signaling included in the fourth message received by the electronic device, refer to the specific descriptions of the second MAC CE signaling included in the fourth message. Details are not described herein again.

If the uplink behavior of the second carrier is a deactivated SUL, and uplink aggregation is performed between the second carrier and the first carrier, for specific descriptions of the second DCI signaling included in the second message received by the electronic device, refer to specific descriptions of the second MAC CE signaling included in the fourth message. Details are not described herein again.

If the uplink of the second carrier is aggregated with the uplink of the first carrier, for specific descriptions of the second DCI signaling included in the second message received by the electronic device, refer to specific descriptions of the second MAC CE signaling included in the fourth message. Details are not described herein again.

Optionally, the fourth message received by the electronic device includes second MAC CE signaling, and the second MAC CE signaling includes a 1-bit UL transmission MAC CE ($UL_iC$), where i is a positive integer, and indicates a quantity of carriers. A value of the UL transmission MAC CE is used to indicate an uplink operation of the serving cell corresponding to the second carrier. A value of the 1-bit UL transmission MAC CE may be 0 or 1.

The value of the 1-bit UL transmission MAC CE may specifically include the following several cases.

Case 1: A value 0 of the $UL_iC$ may be used to indicate that the uplink of the second carrier remains as the supplementary uplink of the first carrier, and a value 1 of the $UL_iC$ may be used to indicate that the uplink of the second carrier is activated as the supplementary uplink of the first carrier.

Case 2: A value 0 of the $UL_iC$ may be used to indicate to reserve the uplink of the second carrier as the supplementary uplink of the first carrier, and a value 1 of the $UL_iC$ may be used to indicate that the uplink of the second carrier is reconfigured as the supplementary uplink of the first carrier.

Case 3: A value 0 of the $UL_iC$ may be used to indicate that the uplink of the second carrier is reconfigured as the supplementary uplink of the first carrier, and a value 1 of the $UL_iC$ may be used to indicate that the uplink of the second carrier is activated as the supplementary uplink of the first carrier.

It should be noted that the uplink operation corresponding to the value of the $UL_iC$ is an example of this embodiment of this application, and may not be limited to that listed in this embodiment of this application. For example, in Case 1, the value 1 of the $UL_iC$ may be used to indicate that the uplink of the second carrier remains as the supplementary uplink of the first carrier, and the value 0 of the $UL_iC$ may be used to indicate that the uplink of the second carrier is activated as the supplementary uplink of the first carrier.

For example, before the electronic device receives the second message to release or deactivate the secondary serving cell, if the uplink of the second carrier is the supplementary uplink of the first carrier, the value of the UL transmission MAC CE in the second MAC CE signaling included in the fourth message received by the electronic device may be 0 in Case 1 or 0 in case 2. The electronic device reserves the uplink of the second carrier as the supplementary uplink of the first carrier, that is, includes the SUL-related configuration information on the second carrier.

Figure 8A:
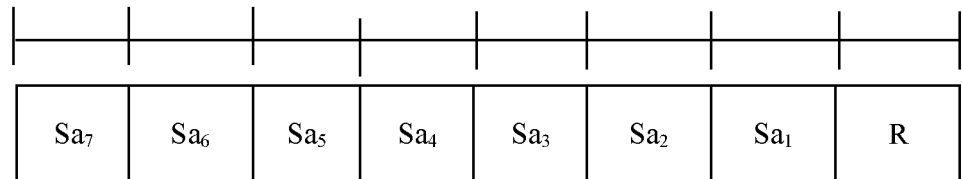
FIG. 8A is a schematic diagram of an SUL active MAC CE according to an embodiment of this application.

If the uplink of the second carrier is a deactivated SUL, and uplink aggregation is performed between the second carrier and the first carrier, the value of the UL transmission MAC CE in the second MAC CE signaling included in the fourth message received by the electronic device may be 1 in Case 1 or 1 in Case 3. The electronic device activates the uplink of the second carrier as the supplementary uplink of the first carrier. That is, the SUL-related configuration information on the second carrier is activated, and the second carrier is converted into the SUL of the first carrier by deactivating the SUL and transmitting the second carrier by aggregating with the uplink of the first carrier. It should be noted that, in this case, the UL transmission MAC CE may be referred to as an SUL active MAC CE ($Sa_i$), and i represents a quantity of SULs. FIG. 8A is a schematic diagram of an SUL active MAC CE. It can be learned from FIG. 8A that $Sa_i$ represents an active state of the SUL. When a value of $Sa_i$ is 1, it indicates that the SUL is activated. When a value of $Sa_2$ is 1, it indicates that the SUL-related configuration information on the second carrier is activated. R in FIG. 8A represents a flexible configuration area.

If the uplink of the second carrier is aggregated with the uplink of the first carrier, the value of the UL transmission MAC CE in the second MAC CE signaling included in the fourth message received by the electronic device may be 1 in Case 2 or 0 in Case 3. The electronic device reconfigures the uplink of the second carrier as the supplementary uplink of the first carrier, that is, reconfigures an uplink configuration related to carrier aggregation on the second carrier as an SUL configuration.

Optionally, the fourth message received by the electronic device includes second DCI signaling, DCI formats 0_0 and 0_1 include a 1-bit UL transmission indicator, and the UL transmission indicator is used to indicate an uplink transmission manner of the serving cell corresponding to the second carrier.

For a case included in the value of the 1-bit UL transmission indicator, refer to the case included in the value of the 1-bit UL transmission MAC CE. Details are not described herein again.

For example, before the electronic device receives the second message to release or deactivate the secondary serving cell, if the uplink of the second carrier is the supplementary uplink of the first carrier, for specific descriptions of the second DCI signaling included in the fourth message received by the electronic device, refer to the specific descriptions of the second MAC CE signaling included in the fourth message. Details are not described herein again.

If the uplink of the second carrier is a deactivated SUL, and uplink aggregation is performed between the second carrier and the first carrier, the fourth message received by the electronic device includes the second DCI signaling, the DCI formats 0_0 and 0_1 include the 1-bit UL transmission indicator, and the value of the 1-bit UL transmission indicator may be 1 in Case 1 or 1 in Case 3. The electronic device activates the uplink of the second carrier as the supplementary uplink of the first carrier. That is, the SUL-related configuration information on the second carrier is activated, and the second carrier is converted into the SUL of the first carrier by deactivating the SUL and transmitting the second carrier by aggregating with the uplink of the first carrier. It should be noted that, in this case, the UL transmission indicator may be referred to as an SUL active indicator.

If the uplink of the second carrier is aggregated with the uplink of the first carrier, for specific descriptions of the second DCI signaling included in the fourth message received by the electronic device, refer to specific descriptions of the second MAC CE signaling included in the fourth message. Details are not described herein again.

Figure 9:
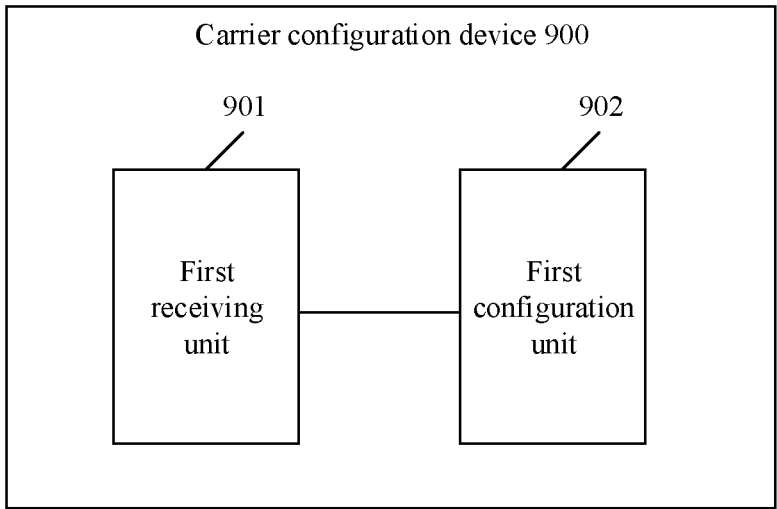
FIG. 9 is a schematic diagram of a structure of a carrier configuration device 900 according to an embodiment of this application.

FIG. 9 is a schematic diagram of a structure of a carrier configuration device 900 according to an embodiment of this application. A first carrier and a second carrier are configured for the device 900. The second carrier is a supplementary uplink carrier of the first carrier. The device 900 may include a first receiving unit 901 and a first configuration unit 902. The device 900 is configured to implement the foregoing carrier configuration method, for example, the carrier configuration method in any embodiment shown in FIG. 4, FIG. 5, FIG. 6, FIG. 7, or FIG. 8.

It may be understood that, in device embodiments of this application, division of a plurality of units or modules is merely logical division based on a function, and is not intended to limit a specific structure of the device. In specific implementation, some function modules may be subdivided into smaller function modules, and some function modules may also be combined into one function module. However, no matter whether these function modules are subdivided or combined, a general procedure performed by the device 900 in a carrier configuration process is the same. Usually, each unit corresponds to respective program code (or a program instruction). When the program code corresponding to the unit is run on a processor, the unit executes a corresponding procedure to implement a corresponding function.

In some possible implementations, the carrier configuration device may be the electronic device in the embodiment shown in FIG. 4, FIG. 5, FIG. 6, FIG. 7, or FIG. 8. The units are described as follows.

A first receiving unit 901 is configured to receive a first message, where the first message includes configuration information of a secondary cell, and the secondary cell includes at least a serving cell corresponding to the second carrier.

A first configuration unit 902 is configured to configure, based on the configuration information of the secondary cell, the serving cell corresponding to the second carrier.

The first configuration unit 902 is specifically configured to:

maintain an uplink of the second carrier as a supplementary uplink of the first carrier, deactivate a supplementary uplink of the second carrier, or aggregate an uplink of the second carrier with an uplink of the first carrier.

In a possible implementation, when the configuration information of the secondary cell includes only a downlink configuration of the second carrier, the first configuration unit 902 is specifically configured to:

maintain the uplink of the second carrier as the supplementary uplink of the first carrier, or deactivate the supplementary uplink of the second carrier.

A downlink of the second carrier and the first carrier correspond to different serving cells.

In a possible implementation, when the configuration information of the secondary cell includes an uplink configuration of the second carrier, the first configuration unit 902 is specifically configured to:

maintain the uplink of the second carrier as the supplementary uplink of the first carrier, or deactivate the supplementary uplink of the second carrier and aggregate the uplink of the second carrier with the uplink of the first carrier.

A downlink of the second carrier and the first carrier correspond to different serving cells.

In a possible implementation, when the supplementary uplink of the second carrier is deactivated, the device 900 further includes:

a third receiving unit 903, configured to receive a third message, where the third message indicates to release or deactivate the secondary cell; and an activation unit 904, configured to release or deactivate the secondary cell, and activate the supplementary uplink of the second carrier.

In a possible implementation, when the uplink of the second carrier remains as the supplementary uplink of the first carrier, the device 900 further includes:

a third receiving unit 903, configured to receive a third message, where the third message indicates to release or deactivate the secondary cell; and a reserving unit 905, configured to release or deactivate the secondary cell, and reserve the supplementary uplink of the second carrier.

In a possible implementation, when the uplink of the second carrier is aggregated with the uplink of the first carrier, the device 900 further includes:

a third receiving unit 903, configured to receive a third message, where the third message indicates to release or deactivate the secondary cell; and a reconfiguration unit 906, configured to release or deactivate the secondary cell, and reconfigure the supplementary uplink of the second carrier.

In a possible implementation, the serving cell corresponding to the second carrier includes an uplink of the serving cell corresponding to the second carrier, and the first configuration unit 901 is specifically configured to:

receive a second message, where the second message is used to indicate to configure the uplink of the serving cell corresponding to the second carrier; and based on the second message, maintain the uplink of the second carrier as the supplementary uplink of the first carrier, deactivate the supplementary uplink of the second carrier, or configure the uplink of the second carrier to be aggregated with the uplink of the first carrier.

In a possible implementation, the device 900 further includes:

a third receiving unit 903, configured to receive a third message, where the third message indicates to release or deactivate the secondary cell; and a second configuration unit 907, configured to release or deactivate the secondary cell, and configure the uplink of the second carrier.

The second configuration unit 907 is specifically configured to:

maintain the uplink of the second carrier as the supplementary uplink of the first carrier, activate the supplementary uplink of the second carrier, or reconfigure the uplink of the second carrier as the supplementary uplink of the first carrier.

In a possible implementation, the device 900 further includes:

a third receiving unit 903, configured to receive a third message, where the third message indicates to release or deactivate the secondary cell;

a third configuration unit 908, configured to release or deactivate the secondary cell; and a fourth receiving and configuring unit 909, configured to receive a fourth message, and configure the uplink of the second carrier.

The fourth receiving and configuring unit 909 is specifically configured to:

maintain the uplink of the second carrier as the supplementary uplink of the first carrier, activate the supplementary uplink of the second carrier, or reconfigure the uplink of the second carrier as the supplementary uplink of the first carrier.

In a possible implementation, the serving cell corresponding to the second carrier includes an uplink of the serving cell corresponding to the second carrier, and the first configuration unit 902 is specifically configured to:

receive a second message, where the second message indicates to configure the uplink of the serving cell corresponding to the second carrier; and based on the second message, maintain the uplink of the second carrier as the supplementary uplink of the first carrier, or configure the uplink of the second carrier to be aggregated with the uplink of the first carrier.

In a possible implementation, the device 900 further includes:

a third receiving unit 903, configured to receive a third message, where the third message indicates to release or deactivate the secondary cell; and a second configuration unit 907, configured to release or deactivate the secondary cell, and configure the uplink of the second carrier.

The second configuration unit 907 is specifically configured to:

maintain the uplink of the second carrier as the supplementary uplink of the first carrier, or reconfigure the uplink of the second carrier as the supplementary uplink of the first carrier.

In a possible implementation, the device 900 further includes:

a third receiving unit 903, configured to receive a third message, where the third message indicates to release or deactivate the secondary cell;

a third configuration unit 908, configured to release or deactivate the secondary cell; and a fourth receiving and configuring unit 909, configured to receive a fourth message, and configure the uplink of the second carrier.

The fourth receiving and configuring unit 909 is specifically configured to:

maintain the uplink of the second carrier as the supplementary uplink of the first carrier, or reconfigure the uplink of the second carrier as the supplementary uplink of the first carrier.

It should be noted that for implementation of each unit, refer to corresponding descriptions in the embodiment shown in FIG. 4, FIG. 5, FIG. 6, FIG. 7, or FIG. 8.

An embodiment of this application further provides a computer readable storage medium. The computer readable storage medium stores a computer program. When the computer program is run on one or more processors, the method in any one of the embodiment shown in FIG. 4, FIG. 5, FIG. 6, FIG. 7, or FIG. 8 is performed.

An embodiment of this application further provides a chip system. The chip system includes at least one processor, a memory, and an interface circuit. The interface circuit is configured to provide an information input/output for the at least one processor, the at least one memory stores a computer program, and when the computer program is run on one or more processors, the method in any one of the embodiment shown in FIG. 4, FIG. 5, FIG. 6, FIG. 7, or FIG. 8 is performed.

The electronic device, the network device, the computer storage medium, the computer program product, and the chip system provided in the foregoing embodiments of this application are all configured to perform the methods provided above. Therefore, for beneficial effects that can be achieved by the electronic device, the network device, the computer storage medium, the computer program product, and the chip system, refer to beneficial effects corresponding to the methods provided above. Details are not described herein again.

In conclusion, this application further provides the following embodiments.

Embodiment 1: A carrier configuration method, where an electronic device is configured with a first carrier and a second carrier, the second carrier is a supplementary uplink carrier of the first carrier, and the method includes:

the electronic device receives a first message, where the first message includes configuration information of a secondary cell, and the secondary cell includes at least a serving cell corresponding to the second carrier; and the serving cell corresponding to the second carrier is configured based on the configuration information of the secondary cell.

That the serving cell corresponding to the second carrier is configured includes:

an uplink of the second carrier remains as a supplementary uplink of the first carrier, a supplementary uplink of the second carrier is deactivated, or an uplink of the second carrier is aggregated with an uplink of the first carrier.

Embodiment 2: According to the carrier configuration method in Embodiment 1, when the configuration information of the secondary cell includes only a downlink configuration of the second carrier, that the serving cell corresponding to the second carrier is configured includes:

the uplink of the second carrier remains as the supplementary uplink of the first carrier, or the supplementary uplink of the second carrier is deactivated.

A downlink of the second carrier and the first carrier correspond to different serving cells.

Embodiment 3: According to the carrier configuration method in Embodiment 1, when the configuration information of the secondary cell includes an uplink configuration of the second carrier, that the serving cell corresponding to the second carrier is configured includes:

the uplink of the second carrier remains as the supplementary uplink of the first carrier; or the supplementary uplink of the second carrier is deactivated and the uplink of the second carrier is aggregated with the uplink of the first carrier.

A downlink of the second carrier and the first carrier correspond to different serving cells.

Embodiment 4: According to the carrier configuration method in Embodiment 1 to Embodiment 3, when the supplementary uplink of the second carrier is deactivated, the method further includes:

the electronic device receives a third message, where the third message indicates to release or deactivate the secondary cell; and the electronic device releases or deactivates the secondary cell, and activates the supplementary uplink of the second carrier.

Embodiment 5: According to the carrier configuration method in Embodiment 1 to Embodiment 3, when the uplink of the second carrier remains as the supplementary uplink of the first carrier, the method further includes:

the electronic device receives a third message, where the third message indicates to release or deactivate the secondary cell; and the electronic device releases or deactivates the secondary cell, and reserves the supplementary uplink of the second carrier.

Embodiment 6: According to the carrier configuration method in Embodiment 1, when the uplink of the second carrier is aggregated with the uplink of the first carrier, the method further includes:

the electronic device receives a third message, where the third message indicates to release or deactivate the secondary cell; and the electronic device releases or deactivates the secondary cell, and reconfigures the supplementary uplink of the second carrier.

Embodiment 7: According to the carrier configuration method in Embodiment 1, the serving cell corresponding to the second carrier includes an uplink of the serving cell corresponding to the second carrier, and that the serving cell corresponding to the second carrier is configured specifically includes:

a second message is received, where the second message is used to indicate to configure the uplink of the serving cell corresponding to the second carrier; and based on the second message, the uplink of the second carrier remains as the supplementary uplink of the first carrier, the supplementary uplink of the second carrier is deactivated, or the uplink of the second carrier is configured to be aggregated with the uplink of the first carrier.

Embodiment 8: According to the carrier configuration method in Embodiment 7, the method further includes:

a third message is received, where the third message indicates to release or deactivate the secondary cell; and the electronic device releases or deactivates the secondary cell, and configures the uplink of the second carrier.

That the uplink of the second carrier is configured includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 9: According to the carrier configuration method in Embodiment 7, the method further includes:

a third message is received, where the third message indicates to release or deactivate the secondary cell;

the electronic device releases or deactivates the secondary cell;

a fourth message is received, where the fourth message indicates to configure the uplink of the second carrier; and the uplink of the second carrier is configured based on the fourth message.

That the uplink of the second carrier is configured includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 10: According to the carrier configuration method in Embodiment 1, the serving cell corresponding to the second carrier includes an uplink of the serving cell corresponding to the second carrier, and that the serving cell corresponding to the second carrier is configured specifically includes:

a second message is received, where the second message indicates to configure the uplink of the serving cell corresponding to the second carrier; and based on the second message, the uplink of the second carrier remains as the supplementary uplink of the first carrier, or the uplink of the second carrier is configured to be aggregated with the uplink of the first carrier.

Embodiment 11: According to the carrier configuration method in Embodiment 10, the method further includes:

a third message is received, where the third message indicates to release or deactivate the secondary cell; and the electronic device releases or deactivates the secondary cell, and configures the uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 12: According to the carrier configuration method in Embodiment 10, the method further includes:

a third message is received, where the third message indicates to release or deactivate the secondary cell;

the electronic device releases or deactivates the secondary cell;

a fourth message is received where the fourth message indicates to configure the uplink of the second carrier; and the uplink of the second carrier is configured based on the fourth message.

That the uplink of the second carrier is configured includes:

the uplink of the second carrier remains as the supplementary uplink of the first carrier, or the uplink of the second carrier is reconfigured as the supplementary uplink of the first carrier.

Embodiment 13: A carrier configuration method, where the method includes:

a network device sends a first message, where the first message includes configuration information of a secondary cell, the secondary cell includes at least a serving cell corresponding to a second carrier, and the configuration information of the secondary cell is used for the serving cell corresponding to the second carrier.

That the serving cell corresponding to the second carrier is configured includes:

an uplink of the second carrier remains as a supplementary uplink of the first carrier, a supplementary uplink of the second carrier is deactivated, or an uplink of the second carrier is aggregated with an uplink of the first carrier.

Embodiment 14: According to the carrier configuration method in Embodiment 13, the method further includes:

the network device sends a third message, where the third message is used to indicate to release or deactivate the secondary cell and activate the supplementary uplink of the second carrier.

Embodiment 15: According to the carrier configuration method in Embodiment 13, the method further includes:

the network device sends a third message, where the third message is used to indicate to release or deactivate the secondary cell, and reserve the supplementary uplink of the second carrier.

Embodiment 16: According to the carrier configuration method in Embodiment 13, the method further includes:

the network device sends a third message, where the third message is used to indicate to release or deactivate the secondary cell, and reconfigure the supplementary uplink of the second carrier.

Embodiment 17: According to the carrier configuration method in Embodiment 13, that the serving cell corresponding to the second carrier includes an uplink of the serving cell corresponding to the second carrier includes:

the network device sends a second message, where the second message is used to indicate to configure the uplink of the serving cell corresponding to the second carrier.

That the serving cell corresponding to the second carrier includes an uplink of the serving cell corresponding to the second carrier includes:

the uplink of the second carrier remains as the supplementary uplink of the first carrier, the supplementary uplink of the second carrier is deactivated, or the uplink of the second carrier is configured to be aggregated with the uplink of the first carrier.

Embodiment 18: According to the carrier configuration method in Embodiment 17, the method further includes:

the network device sends a third message, where the third message is used to indicate to release or deactivate the secondary cell, and configure the supplementary uplink of the second carrier.

That the uplink of the second carrier is configured includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 19: According to the carrier configuration method in Embodiment 17, the method further includes:

the network device sends a third message, where the third message is used to indicate to release or deactivate the secondary cell; and the network device sends a fourth message, where the fourth message is used to configure the uplink of the second carrier.

Configuring the uplink of the second carrier includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 20: According to the carrier configuration method in Embodiment 19, that the serving cell corresponding to the second carrier includes an uplink of the serving cell corresponding to the second carrier includes:

the network device sends a second message, where the second message is used to indicate to configure the uplink of the serving cell corresponding to the second carrier.

Configuring the uplink of the serving cell corresponding to the second carrier includes:

the uplink of the second carrier remains as the supplementary uplink of the first carrier, or the uplink of the second carrier is configured to be aggregated with the uplink of the first carrier.

Embodiment 21: According to the carrier configuration method in Embodiment 20, the method further includes:

the network device sends the third message, where the third message is used to release or deactivate the secondary cell, and configure the supplementary uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 22: According to the carrier configuration method in Embodiment 20, the method further includes:

the network device sends the third message, where the third message is used to indicate to release or deactivate the secondary cell; and the network device sends the fourth message, where the fourth message is used to indicate to configure the uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 23: A carrier configuration device, where a first carrier and a second carrier are configured for the device, the second carrier is a supplementary uplink carrier of the first carrier, and the device includes:

a first receiving unit, configured to receive a first message, where the first message includes configuration information of a secondary cell, and the secondary cell includes at least a serving cell corresponding to the second carrier; and a first configuration unit, configured to configure, based on the configuration information of the secondary cell, the serving cell corresponding to the second carrier.

The first configuration unit is specifically configured to:

maintain an uplink of the second carrier as a supplementary uplink of the first carrier, deactivate a supplementary uplink of the second carrier, or aggregate an uplink of the second carrier with an uplink of the first carrier.

Embodiment 24: According to the carrier configuration device in Embodiment 23, when the configuration information of the secondary cell includes only a downlink configuration of the second carrier, the first configuration unit is specifically configured to:

maintain the uplink of the second carrier as the supplementary uplink of the first carrier, or deactivate the supplementary uplink of the second carrier.

A downlink of the second carrier and the first carrier correspond to different serving cells.

Embodiment 25: According to the carrier configuration device in Embodiment 24, when the configuration information of the secondary cell includes an uplink configuration of the second carrier, the first configuration unit is specifically configured to:

maintain the uplink of the second carrier as the supplementary uplink of the first carrier, or deactivate the supplementary uplink of the second carrier and aggregate the uplink of the second carrier with the uplink of the first carrier.

The downlink of the second carrier and the first carrier correspond to different serving cells.

Embodiment 26: According to the carrier configuration device in any one of Embodiment 23 to Embodiment 25, when the supplementary uplink of the second carrier is deactivated, the device further includes:

a third receiving unit, configured to receive a third message, where the third message indicates to release or deactivate the secondary cell; and an activation unit, configured to release or deactivate the secondary cell, and activate the supplementary uplink of the second carrier.

Embodiment 27: According to the carrier configuration device in any one of Embodiment 23 to Embodiment 25, when the uplink of the second carrier remains as the supplementary uplink of the first carrier, the device further includes:

a third receiving unit, configured to receive a third message, where the third message indicates to release or deactivate the secondary cell; and a reserving unit, configured to release or deactivate the secondary cell, and reserve the supplementary uplink of the second carrier.

Embodiment 28: According to the carrier configuration device in any one of Embodiment 23 to Embodiment 25, when the uplink of the second carrier is aggregated with the uplink of the first carrier, the device further includes:

a third receiving unit, configured to receive a third message, where the third message indicates to release or deactivate the secondary cell; and a reconfiguration unit, configured to release or deactivate the secondary cell, and reconfigure the supplementary uplink of the second carrier.

Embodiment 29: According to the carrier configuration device in Embodiment 23, the serving cell corresponding to the second carrier includes an uplink of the serving cell corresponding to the second carrier, and the first configuration unit is specifically configured to:

receive a second message, where the second message is used to indicate to configure the uplink of the serving cell corresponding to the second carrier; and based on the second message, maintain the uplink of the second carrier as the supplementary uplink of the first carrier, deactivate the supplementary uplink of the second carrier, or configure the uplink of the second carrier to be aggregated with the uplink of the first carrier.

Embodiment 30: According to the carrier configuration device in Embodiment 29, the device further includes:

a third receiving unit, configured to receive a third message, where the third message indicates to release or deactivate the secondary cell; and a second configuration unit, configured to release or deactivate the secondary cell, and configure the uplink of the second carrier.

The second configuration unit is specifically configured to:

maintain the uplink of the second carrier as the supplementary uplink of the first carrier, activate the supplementary uplink of the second carrier, or reconfigure the uplink of the second carrier as the supplementary uplink of the first carrier.

Embodiment 31: According to the device in Embodiment 29, the device further includes:

a third receiving unit, configured to receive a third message, where the third message indicates to release or deactivate the secondary cell;

a third configuration unit, configured to release or deactivate the secondary cell; and a fourth receiving and configuring unit, configured to receive a fourth message, and configure the uplink of the second carrier.

The fourth receiving and configuring unit is specifically configured to:

maintain the uplink of the second carrier as the supplementary uplink of the first carrier, activate the supplementary uplink of the second carrier, or reconfigure the uplink of the second carrier as the supplementary uplink of the first carrier.

Embodiment 32: According to the carrier configuration device in Embodiment 23, the serving cell corresponding to the second carrier includes an uplink of the serving cell corresponding to the second carrier, and the first configuration unit is specifically configured to:

receive a second message, where the second message indicates to configure the uplink of the serving cell corresponding to the second carrier; and based on the second message, maintain the uplink of the second carrier as the supplementary uplink of the first carrier, or configure the uplink of the second carrier to be aggregated with the uplink of the first carrier.

Embodiment 33: According to the carrier configuration device in Embodiment 32, the device further includes:

a third receiving unit, configured to receive a third message, where the third message indicates to release or deactivate the secondary cell; and a second configuration unit, configured to release or deactivate the secondary cell, and configure the uplink of the second carrier.

The second configuration unit is specifically configured to:

maintain the uplink of the second carrier as the supplementary uplink of the first carrier, or reconfigure the uplink of the second carrier as the supplementary uplink of the first carrier.

Embodiment 34: According to the carrier configuration device in Embodiment 32, the device further includes:

a third receiving unit, configured to receive a third message, where the third message indicates to release or deactivate the secondary cell;

a third configuration unit, configured to release or deactivate the secondary cell; and a fourth receiving and configuring unit, configured to receive a fourth message, and configure the uplink of the second carrier; where the fourth receiving and configuring unit is specifically configured to:

maintain the uplink of the second carrier as the supplementary uplink of the first carrier, or reconfigure the uplink of the second carrier as the supplementary uplink of the first carrier.

Embodiment 35: A carrier configuration device, where the device includes:

a first sending unit, configured to send a first message, where the first message includes configuration information of a secondary cell, the secondary cell includes at least a serving cell corresponding to the second carrier, and the configuration information of the secondary cell is used for the serving cell corresponding to the second carrier.

That the serving cell corresponding to the second carrier is configured includes:

an uplink of the second carrier remains as a supplementary uplink of the first carrier, a supplementary uplink of the second carrier is deactivated, or an uplink of the second carrier is aggregated with an uplink of the first carrier.

Embodiment 36: According to the carrier configuration device in Embodiment 35, the device further includes:

a third sending unit, configured to send a third message, where the third message is used to indicate to release or deactivate the secondary cell, and activate the supplementary uplink of the second carrier.

Embodiment 37: According to the carrier configuration device in Embodiment 35, the device further includes:

a third sending unit, configured to send a third message, where the third message is used to indicate to release or deactivate the secondary cell, and reserve the supplementary uplink of the second carrier.

Embodiment 38: According to the carrier configuration device in Embodiment 35, the device further includes:

a third sending unit, configured to send a third message, where the third message is used to indicate to release or deactivate the secondary cell, and reconfigure the supplementary uplink of the second carrier.

Embodiment 39: According to the carrier configuration device in Embodiment 35, that the serving cell corresponding to the second carrier includes an uplink of the serving cell corresponding to the second carrier includes:

a second sending unit, configured to send a second message, where the second message is used to indicate to configure the uplink of the serving cell corresponding to the second carrier.

That the serving cell corresponding to the second carrier includes an uplink of the serving cell corresponding to the second carrier includes:

the uplink of the second carrier remains as the supplementary uplink of the first carrier, the supplementary uplink of the second carrier is deactivated, or the uplink of the second carrier is configured to be aggregated with the uplink of the first carrier.

Embodiment 40: According to the carrier configuration device in Embodiment 39, the device further includes:

a third sending unit, configured to send a third message, where the third message is used to indicate to release or deactivate the secondary cell, and configure the uplink of the second carrier.

That the uplink of the second carrier is configured includes:

maintaining the uplink of the second carrier as the supplementary uplink of the first carrier, activating the supplementary uplink of the second carrier, or reconfiguring the uplink of the second carrier as the supplementary uplink of the first carrier.

Embodiment 41: According to the carrier configuration device in Embodiment 39, the device further includes:

a third sending unit, configured to send a third message, where the third message indicates to release or deactivate the secondary cell.

A network device sends a fourth message, where the fourth message is used to configure the uplink of the second carrier.

Configuring the uplink of the second carrier includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 42: According to the carrier configuration device in Embodiment 41, that the serving cell corresponding to the second carrier includes an uplink of the serving cell corresponding to the second carrier includes:

the second sending unit, configured to send the second message, where the second message is used to indicate to configure the uplink of the serving cell corresponding to the second carrier.

Configuring the uplink of the serving cell corresponding to the second carrier includes:

the uplink of the second carrier remains as the supplementary uplink of the first carrier, or the uplink of the second carrier is configured to be aggregated with the uplink of the first carrier.

Embodiment 43: According to the carrier configuration device in Embodiment 42, the device further includes:

the third sending unit, configured to send the third message, where the third message is used to indicate to release or deactivate the secondary cell, and configure the uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 44: According to the carrier configuration device in Embodiment 42, the device further includes:

the third sending unit, configured to send the third message, where the third message indicates to release or deactivate the secondary cell; and a fourth sending unit, configured to send a fourth message, where the fourth message is used to indicate to configure the uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 45: A communications system, including an electronic device and a network device, where a first carrier and a second carrier are configured for the electronic device, the second carrier is a supplementary uplink carrier of the first carrier, and the communications system includes:

a network device, configured to send a first message, where the first message includes configuration information of a secondary cell, and the secondary cell includes at least a serving cell corresponding to the second carrier; and an electronic device, configured to receive the first message.

The electronic device is configured to configure the serving cell corresponding to the second carrier based on the configuration information of the secondary cell.

That the serving cell corresponding to the second carrier is configured includes:

an uplink of the second carrier remains as a supplementary uplink of the first carrier, a supplementary uplink of the second carrier is deactivated, or an uplink of the second carrier is aggregated with an uplink of the first carrier.

Embodiment 46: According to the communications system in Embodiment 45, when the configuration information of the secondary cell includes only a downlink configuration of the second carrier, the electronic device, based on the configuration information of the secondary cell, is specifically configured to:

maintain the uplink of the second carrier as the supplementary uplink of the first carrier, or deactivate the supplementary uplink of the second carrier.

A downlink of the second carrier and the first carrier correspond to different serving cells.

Embodiment 47: According to the communications system in Embodiment 45, when the configuration information of the secondary cell includes the uplink configuration of the second carrier, the electronic device, based on the configuration information of the secondary cell, is specifically configured to: maintain the uplink of the second carrier as the supplementary uplink of the first carrier, or deactivate the supplementary uplink of the second carrier and aggregate the uplink of the second carrier with the uplink of the first carrier.

A downlink of the second carrier and the first carrier correspond to different serving cells.

Embodiment 48: According to the communications system in any one of Embodiment 45 to Embodiment 47, when the supplementary uplink of the second carrier is deactivated, the electronic device is configured to receive a third message, where the third message indicates to release or deactivate the secondary cell.

The electronic device is configured to release or deactivate the secondary cell, and activate the supplementary uplink of the second carrier.

Embodiment 49: According to the communications system in any one of Embodiment 45 to Embodiment 47, when the uplink of the second carrier remains as the supplementary uplink of the first carrier, the electronic device is configured to receive a third message, where the third message indicates to release or deactivate the secondary cell.

The electronic device is configured to release or deactivate the secondary cell, and reserve the supplementary uplink of the second carrier.

Embodiment 50: According to the communications system in any one of Embodiment 45 to Embodiment 47, when the uplink of the second carrier is aggregated with the uplink of the first carrier, the electronic device is configured to receive a third message, where the third message indicates to release or deactivate the secondary cell.

The electronic device is configured to release or deactivate the secondary cell, and reconfigure the supplementary uplink of the second carrier.

Embodiment 51: According to the communications system in Embodiment 45, the serving cell corresponding to the second carrier includes an uplink of the serving cell corresponding to the second carrier, and that the serving cell corresponding to the second carrier is configured includes:

a network device, configured to send a second message, where the second message is used to indicate to configure the uplink of the serving cell corresponding to the second carrier; and an electronic device, configured to receive the second message.

The electronic device is configured to: based on the second message, maintain the uplink of the second carrier as the supplementary uplink of the first carrier, deactivate the supplementary uplink of the second carrier, or configure the uplink of the second carrier to be aggregated with the uplink of the first carrier.

Embodiment 52: According to the communications system in Embodiment 51, the network device is further configured to send a third message, where the third message is used to release or deactivate the secondary cell, and configure the uplink of the second carrier.

The electronic device is further configured to receive the third message.

The electronic device is further configured to release or deactivate the secondary cell, and configure the uplink of the second carrier.

That the uplink of the second carrier is configured includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 53: According to the communications system in Embodiment 51, the network device is further configured to send a third message, where the third message is used to indicate to release or deactivate the secondary cell.

The electronic device is further configured to receive the third message.

The electronic device is further configured to indicate to release or deactivate the secondary cell.

The network device is further configured to send a fourth message, where the fourth message is used to indicate to configure the uplink of the second carrier.

The electronic device is further configured to receive the fourth message.

The electronic device is configured to configure the uplink of the second carrier.

That the uplink of the second carrier is configured includes:

the uplink of the second carrier remains as the supplementary uplink of the first carrier, the supplementary uplink of the second carrier is activated, or the uplink of the second carrier is reconfigured as the supplementary uplink of the first carrier.

Embodiment 54: According to the communications system in Embodiment 45, the serving cell corresponding to the second carrier includes an uplink of the serving cell corresponding to the second carrier, and that the serving cell corresponding to the second carrier is configured includes:

the network device is configured to receive a second message, where the second message indicates to configure the uplink of the serving cell corresponding to the second carrier.

The electronic device is configured to receive the second message.

The electronic device is configured to: based on the second message, maintain the uplink of the second carrier as the supplementary uplink of the first carrier, or configure the uplink of the second carrier to be aggregated with the uplink of the first carrier.

Embodiment 55: According to the communications system in Embodiment 54, the network device is further configured to send a third message, where the third message is used to release or deactivate the secondary cell, and configure the uplink of the second carrier.

The electronic device is further configured to receive the third message.

The electronic device is further configured to release or deactivate the secondary cell, and configure the uplink of the second carrier.

That the uplink of the second carrier is configured includes:

the uplink of the second carrier remains as the supplementary uplink of the first carrier, or the uplink of the second carrier is reconfigured as the supplementary uplink of the first carrier.

Embodiment 56: According to the communications system in Embodiment 54, the network device is further configured to send a third message, where the third message is used to indicate to release or deactivate the secondary cell.

The electronic device is further configured to receive the third message.

The electronic device is further configured to release or deactivate the secondary cell.

The network device is further configured to send a fourth message, where the fourth message is used to indicate to configure the uplink of the second carrier.

The electronic device is further configured to receive the fourth message.

The electronic device is further configured to configure the uplink of the second carrier based on the fourth message.

That the uplink of the second carrier is configured includes:

the uplink of the second carrier remains as the supplementary uplink of the first carrier, or the uplink of the second carrier is reconfigured as the supplementary uplink of the first carrier.

Embodiment 57: A communications device, where the communications device may be an electronic device, a chip in the electronic device, or a system on chip, a first carrier and a second carrier are configured for the communications device, the second carrier is a supplementary uplink carrier of the first carrier, and the communications device includes a processor and a memory, where the processor is coupled to the memory. The memory is configured to store computer program instructions. When the processor executes the computer program instructions, the communications device is enabled to perform the carrier configuration method according to any one of Embodiment 1 to Embodiment 12.

Embodiment 58: A communications device, where the communications device may be a network device, a chip in the network device, or a system on chip, a first carrier and a second carrier are configured for the communications device, the second carrier is a supplementary uplink carrier of the first carrier, and the communications device includes a processor and a memory, where the processor is coupled to the memory. The memory is configured to store computer program instructions. When the processor executes the computer program instructions, the communications device is enabled to perform the carrier configuration method according to any one of Embodiment 13 to Embodiment 22.

Embodiment 59: A computer-readable storage medium, where the computer-readable storage medium stores a computer program, and when the computer program is run on one or more processors, the carrier configuration method according to any one of Embodiment 1 to Embodiment 22 is performed.

Embodiment 60: A computer program product, where when the computer program product is executed on one or more processors, the carrier configuration method according to any one of Embodiment 1 to Embodiment 22 is performed.

Embodiment 61: A chip system, where the chip system includes at least one processor, a memory, and an interface circuit, the interface circuit is configured to provide information input/output for the at least one processor, the memory stores a computer program, and when the computer program runs on one or more processors, the carrier configuration method according to any one of Embodiment 1 to Embodiment 22 is performed.

Although this application is described with reference to embodiments herein, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

What is claimed is:

1. A carrier configuration method, applied to an electronic device, the method comprising:

receiving, by the electronic device configured with a first carrier and a second carrier of a first serving cell, a first message comprising configuration information of a secondary cell, wherein the second carrier is a supplementary uplink (SUL) carrier of the first carrier and is configured with a first uplink as an SUL of the first serving cell, wherein the secondary cell comprises a second serving cell corresponding to the second carrier, wherein the configuration information of the secondary cell comprises a downlink configuration of the second carrier, with the downlink configuration of the second carrier being used to configure a first downlink of the second carrier for the second serving cell and to aggregate the first downlink of the second carrier with a second downlink of the first carrier for the first serving cell; and configuring, by the electronic device, the second serving cell corresponding to the second carrier based on the configuration information of the secondary cell such that the first uplink of the second carrier remains as the SUL of the first serving cell, the SUL of the first serving cell is deactivated, or a second uplink of the second carrier for the second serving cell is aggregated with a third uplink of the first carrier for the first serving cell.

2. The method according to claim 1, wherein the configuration information of the secondary cell comprises an uplink configuration of the second carrier, with the uplink configuration of the second carrier being used to configure an uplink of the second carrier for the second serving cell, the configuring the second serving cell corresponding to the second carrier comprises:

deactivating the SUL of the first serving cell; and aggregating the second uplink of the second carrier with the third uplink of the first carrier in accordance with the uplink configuration of the second carrier.

3. The method according to claim 1, wherein when the SUL of the first serving cell is deactivated, the method further comprises:

aggregating, by the electronic device, the first uplink of the second carrier with an uplink of the first carrier for the first serving cell.

4. The method according to claim 1, wherein when the SUL of the first serving cell is deactivated, the method further comprises:

receiving, by the electronic device, a third message indicating to release or deactivate the secondary cell;

releasing or deactivating, by the electronic device, the secondary cell; and activating, by the electronic device, the SUL of the first serving cell on the second carrier.

5. The method according to claim 1, wherein the first uplink of the second carrier remains as the SUL of the first serving cell, the method further comprises:

receiving, by the electronic device, a second message indicating to release or deactivate the secondary cell;

releasing or deactivating, by the electronic device, the secondary cell while reserving the SUL of the first serving cell.

6. The method according to claim 1, wherein when the uplink of the second carrier is aggregated with the uplink of the first carrier, the method further comprises:

receiving, by the electronic device, a third message indicating to release or deactivate the secondary cell;

releasing or deactivating, by the electronic device, the secondary cell; and reconfiguring, by the electronic device, the SUL of the first serving cell on the second carrier.

7. The method according to claim 1, wherein the method further comprises:

receiving, by the electronic device, a third message indicating to release or deactivate the secondary cell;

releasing or deactivating, by the electronic device, the secondary cell while maintaining the first uplink of the second carrier as the SUL of the first serving cell, activating the SUL of the first serving cell on the second carrier to an SUL activated state from an SUL deactivated state, or reconfiguring the first uplink of the second carrier as the SUL of the first serving cell.

8. The method according to claim 1, the method further comprising:

receiving, by the electronic device, a signal from the first downlink of the second serving cell, the signal comprising at least one of a synchronization signal or a downlink reference signal; and performing, by the electronic device, an uplink transmission on the SUL of the first serving cell on the second carrier in accordance with the signal from the first downlink of the second serving cell.

9. The method according to claim 8, wherein the performing, by the electronic device, an uplink transmission on the SUL of the first serving cell on the second carrier in accordance with the signal from the first downlink of the second serving cell comprises at least one of the following operations:

determining, by the electronic device, an uplink sending timing advance for the SUL of the first serving in accordance with the synchronization signal from the first downlink of the second serving cell;

calculating, by the electronic device, a path loss of the supplement uplink of the first serving based on a downlink reference signal received power (RSRP) of the downlink reference signal; or adjusting, by the electronic device, a transmit beam of a transmit beam of the supplement uplink the first serving cell based on the downlink RSRP of the downlink reference signal.

10. A communications device, comprising:

a processor, and a memory, configured to couple to the processor and store program instructions that, when executed by the processor, cause the communication device to perform the following operations:

receiving a first message comprising configuration information of a secondary cell, wherein the communication device is configured with a first carrier and a second carrier of a first serving cell, with the second carrier being a supplementary uplink (SUL) carrier of the first carrier and configured with a first uplink as an SUL of the first serving cell, wherein the secondary cell comprises a second serving cell corresponding to the second carrier, wherein the configuration information of the secondary cell comprises a downlink configuration of the second carrier, with the downlink configuration of the second carrier being used to configure a first downlink of the second carrier for the second serving cell and to aggregate the first downlink of the second carrier with a second downlink of the first carrier for the first serving cell; and configuring the second serving cell corresponding to the second carrier based on the configuration information of the secondary cell such that the first uplink of the second carrier remains as the SUL of the first serving cell, the SUL of the first serving cell is deactivated, or a second uplink of the second carrier for the second serving cell is aggregated with a third uplink of the first carrier for the first serving cell.

11. The communications device according to claim 10, wherein the configuration information of the secondary cell comprises an uplink configuration of the second carrier, with the uplink configuration of the second carrier being used to configure an uplink of the second carrier for the second serving cell, the configuring the second serving cell corresponding to the second carrier comprises:

deactivating the SUL of the first serving cell; and aggregating the second uplink of the second carrier with the third uplink of the first carrier in accordance with the uplink configuration of the second carrier.

12. The communications device according to claim 10, wherein when the SUL of the first serving cell is deactivated, the program instructions, when executed by the processor, cause the communication device to perform the following operations:

aggregating the first uplink of the second carrier with an uplink of the first carrier for the first serving cell.

13. The communications device according to claim 10, wherein when the SUL of the first serving cell is deactivated, the program instructions, when executed by the processor, cause the communication device to perform the following operations:

receiving a third message indicating to release or deactivate the secondary cell;

releasing or deactivating the secondary cell; and activating the SUL of the first serving cell on the second carrier.

14. The communications device according to claim 10, wherein the first uplink of the second carrier remains as the SUL of the first serving cell, the program instructions, when executed by the processor, cause the communication device to perform the following operations:

receiving a second message indicating to release or deactivate the secondary cell;

releasing or deactivating the secondary cell while reserving the SUL of the first serving cell.

15. The communications device according to claim 10, wherein when the uplink of the second carrier is aggregated with the uplink of the first carrier, the program instructions, when executed by the processor, cause the communication device to perform the following operations:

receiving a third message indicating to release or deactivate the secondary cell;

releasing or deactivating the secondary cell; and reconfiguring the SUL of the first serving cell on the second carrier.

16. The communications device according to claim 10, wherein the program instructions, when executed by the processor, cause the communication device to perform the following operations:

receiving a third message indicating to release or deactivate the secondary cell;

releasing or deactivating the secondary cell while maintaining the first uplink of the second carrier as the SUL of the first serving cell, activating the SUL of the first serving cell on the second carrier to an SUL activated state from an SUL deactivated state, or reconfiguring the first uplink of the second carrier as the SUL of the first serving cell.

17. The communications device according to claim 10, wherein the program instructions, when executed by the processor, cause the communication device to perform the following operations:

receiving a signal from the first downlink of the second serving cell, the signal comprising at least one of a synchronization signal or a downlink reference signal; and performing an uplink transmission on the SUL of the first serving cell on the second carrier in accordance with the signal from the first downlink of the second serving cell.

18. The communications device according to claim 17, wherein the performing an uplink transmission on the SUL of the first serving cell on the second carrier in accordance with the signal from the first downlink of the second serving cell comprises at least one of the following operations:

determining an uplink sending timing advance for the SUL of the first serving in accordance with the synchronization signal from the first downlink of the second serving cell;

calculating a path loss of the supplement uplink of the first serving based on a downlink reference signal received power (RSRP) of the downlink reference signal; or adjusting a transmit beam of a transmit beam of the SUL the first serving cell based on the RSRP of the downlink reference signal.

19. A non-transitory computer-readable storage medium on which a computer program is stored, wherein the program, when executed by a processor, implements the following operations:

receiving a first message comprising configuration information of a secondary cell, wherein the communication device is configured with a first carrier and a second carrier of a first serving cell, with the second carrier being a supplementary uplink (SUL) carrier of the first carrier and configured with a first uplink as an SUL of the first serving cell, wherein the secondary cell comprises a second serving cell corresponding to the second carrier, wherein the configuration information of the secondary cell comprises a downlink configuration of the second carrier, with the downlink configuration of the second carrier being used to configure a first downlink of the second carrier for the second serving cell and to aggregate the first downlink of the second carrier with a second downlink of the first carrier for the first serving cell; and configuring the second serving cell corresponding to the second carrier based on the configuration information of the secondary cell such that the first uplink of the second carrier remains as the SUL of the first serving cell, the SUL of the first serving cell is deactivated, or a second uplink of the second carrier for the second serving cell is aggregated with a third uplink of the first carrier for the first serving cell.

* * * * *